(12) United States Patent
Agazzi

(10) Patent No.: US 7,881,406 B2
(45) Date of Patent: *Feb. 1, 2011

(54) METHOD, APPARATUS AND SYSTEM FOR HIGH-SPEED TRANSMISSION ON FIBER OPTIC CHANNEL

(75) Inventor: Oscar E. Agazzi, Irvine, CA (US)

(73) Assignee: Broadcom Corp.

( * ) Notice: Subject to any disclaimer, the term of this patent is extended or adjusted under 35 U.S.C. 154(b) by 0 days.

This patent is subject to a terminal disclaimer.

(21) Appl. No.: 12/055,093

(22) Filed: Mar. 25, 2008

(65) Prior Publication Data

US 2008/0170641 A1    Jul. 17, 2008

Related U.S. Application Data

(60) Continuation of application No. 11/567,972, filed on Dec. 7, 2006, now Pat. No. 7,349,492, which is a continuation of application No. 10/713,400, filed on Nov. 14, 2003, now Pat. No. 7,158,584, which is a division of application No. 09/693,709, filed on Oct. 20, 2000, now Pat. No. 6,879,640.

(60) Provisional application No. 60/160,501, filed on Oct. 20, 1999.

(51) Int. Cl.
*H03K 9/00* (2006.01)
(52) U.S. Cl. ................ 375/316; 375/265; 375/329
(58) Field of Classification Search ........... 375/316, 375/324, 341, 329, 265
See application file for complete search history.

(56) References Cited

U.S. PATENT DOCUMENTS 5,712,872 A * 1/1998 Hawkins et al. ............ 375/222

5,896,211 A * 4/1999 Watanabe .................. 398/76
7,349,492 B2 * 3/2008 Agazzi ..................... 375/316

* cited by examiner

*Primary Examiner*—Temesghen Ghebretinsae
(74) *Attorney, Agent, or Firm*—McAndrews, Held & Malloy, Ltd.

(57) ABSTRACT

Multi-carrier modulation fiber optic systems constructed using a series of electrical carriers, modulating the data on the electrical carriers and combining the carriers to form a wideband signal. The wideband signal can then be intensity modulated on a laser and coupled to a fiber optic channel. A receiver may then receive the laser signal from the fiber optic channel and convert it into an electrical signal. Multi-carrier modulation may be applied to existing fiber channels, which may be of lower quality. Existing fiber channels may have characteristics which prevent or restrict the transmission of data using intensity modulation at certain frequencies. An adaptive multi-carrier modulation transmitter may characterize an existing fiber optic channel and ascertain the overall characteristics of the channel. The transmitter and receiver can then be configured to use various bandwidths and various modulations in order to match the transfer characteristic of the fiber channel. A series of adaptive multi-carrier modulation transmitters and receivers can be integrated on a single integrated circuit. If multiple adaptive receivers and transmitters are integrated on a single integrated circuit, they may be used to upgrade existing networks by adding different wavelength lasers for the transmission of data in order to achieve any capacity desired. Each receiver and transmitter may characterize the fiber for its particular wavelength laser and may configure the modulation and bandpass to the fiber's characteristics.

27 Claims, 18 Drawing Sheets

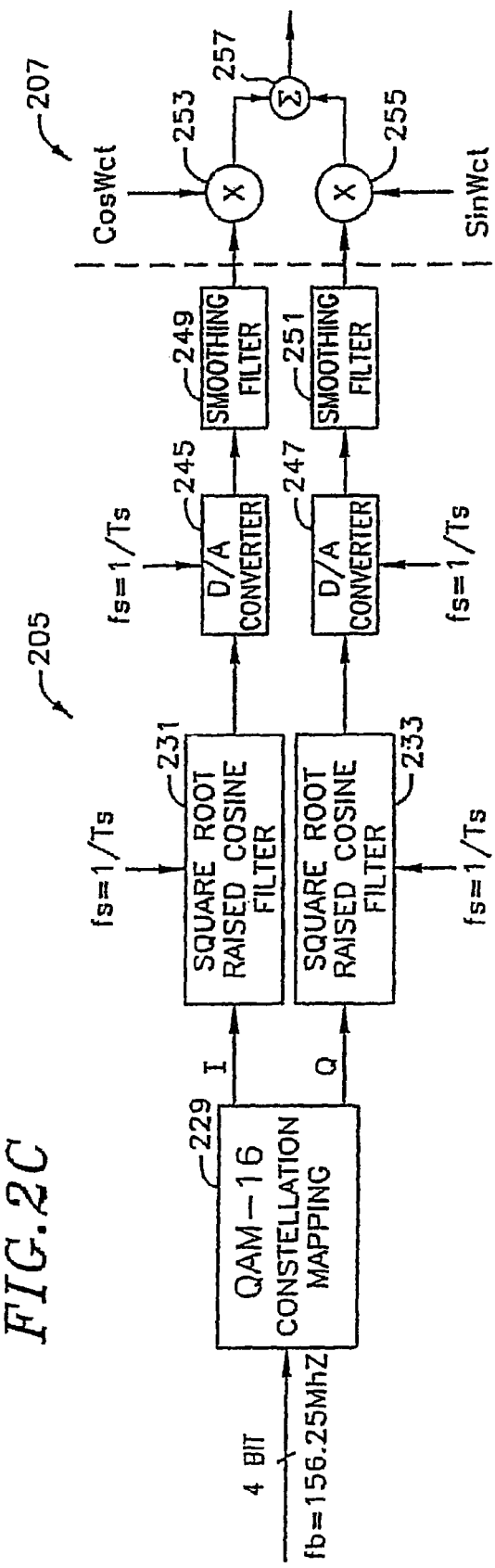

METHOD, APPARATUS AND SYSTEM FOR HIGH-SPEED TRANSMISSION ON FIBER OPTIC CHANNEL

PRIORITY

This application is a continuation of U.S. patent application Ser. No. 11/567,972, filed Dec. 7, 2006 (now U.S. Pat. No. 7,349,492), which is a continuation of U.S. patent application Ser. No. 10/713,400, filed Nov. 14, 2003 (now U.S. Pat. No. 7,158,584), which is a divisional of U.S. patent application Ser. No. 09/693,709, filed Oct. 20, 2000 (now U.S. Pat. No. 6,879,640), which claims the benefit from provisional application 60/160,501, filed on Oct. 20, 1999.

INCORPORATION BY REFERENCE

This application incorporates the content of the application "FULLY INTEGRATED TUNER ARCHITECTURE" filed on Nov. 12, 1999, Ser. No. 09/439,101.

FIELD OF THE INVENTION

The present invention relates to methods and apparatus for the transfer of high rates of data over a fiber optic channels, and in particular embodiments to methods and apparatus which utilize existing fiber optics systems to achieve high data transfer rates.

BACKGROUND OF THE INVENTION

The amount of data carried on fiber optic systems continues to increase. The IEEE (Institute of Electrical and Electronics Engineers) 802.3ae task force is currently working on the definition of a 10 gigabit per second standard for Ethernet applications. Although optical transmission at 10 gigabits per second is possible with current technology, the price of obtaining a 10 gigabit per second data rate may currently be very high because of the necessity of using costly optical components.

Inexpensive optical components, such as fibers and lasers, may result in optical channels with limited bandwidth, nulls, significant noise, distortion and multi-mode transmission characteristics. These characteristics may be problematical when attempting to achieve high data rates. Additionally, some of the fiber systems already in place comprise fibers and components of lower quality than are currently available in modern fiber optic systems. The characteristics of these systems may also be problematical when attempting to increase the transmission rates over such systems. There is therefore a need in the art to improve transmission capability of lower quality fiber optic systems through the use of inexpensive electronics. There is also a need for the use of channel coding and bandwidth efficient modulation techniques to overcome the limitations of low quality optical channels and result in higher transmission rates and reduced system costs.

SUMMARY OF THE INVENTION

Apparatuses for transmitting and receiving data on a fiber channel are disclosed. An example transmitting apparatus comprises an input that receives a digital signal to be transmitted. The apparatus also comprises a plurality of programmable modulators each configured to accept a portion of the digital signal to be transmitted, and to modulate the portion of the digital signal accepted. The modulators communicate with a plurality of mixers, each mixer coupled to the output of one of the programmable modulators to accept a modulated signal and mix it with a mixer frequency. The mixed frequencies are then coupled into a plurality of lowpass filters that filter the output of the mixers. A summation unit then combines the output of the mixers into a single signal.

An example receiving apparatus comprises an input that receives a transmitted optical signal and converts it into an electrical signal. The receiving apparatus also comprises a plurality of programmable mixers which accept the received electrical signal. The mixers are coupled to programmable frequency sources. The mixed frequencies are then coupled into a plurality of bandpass filters that filter the output of the mixers. The filtered signals are then provided to programmable demodulators, which will demodulate the signal according to the modulation used by the transmit apparatus. The demodulated signals are then provided to a XGMII (Ten Gigabit Media Independent Interface), which combines the demodulated signals into a parallel bit stream.

BRIEF DESCRIPTION OF THE DRAWINGS

The following descriptions refer to drawings in which consistent numbers refer to like elements throughout.

FIG. 2C is a block diagram of an analog implementation of a QAM-16 modulator, such as illustrated in FIG. 2A.

DETAILED DESCRIPTION OF THE INVENTION

Figure 1A:
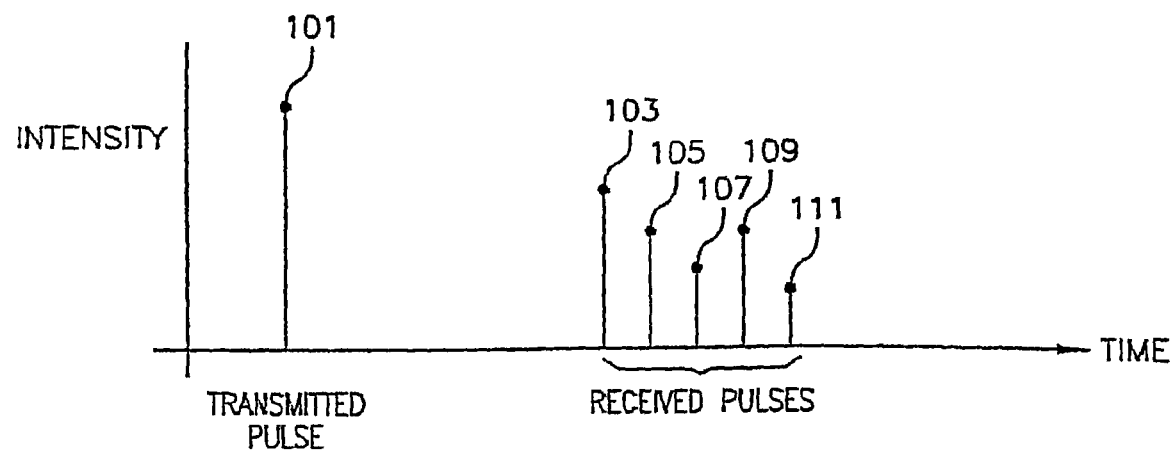
FIG. 1A is a graphical illustration showing a light pulse transmitted through a multimode fiber optic channel and resulting received pulses.

Optical communications systems may achieve very high data rates as a result of the high bandwidth of the optical fibers and the availability of high-speed lasers and photo detectors, as well as wideband laser drivers, transimpedance amplifiers, postamplifiers, and clock and data recovery circuits. However there is a demand for ever increasing speed in communications, and technology is rapidly approaching a point where the optical fiber can no longer be treated as having unlimited bandwidth. This is particularly true for the case of multimode fibers, which may exhibit lower data carrying capacity due to the multimode nature of the fiber. Some modern optical communications systems may be limited in their speed by the bandwidth of the optical fibers.

Bandwidth efficient communications systems have been developed over several decades in the context of narrowband communications, such as voiceband modems and digital subscriber loops. These systems make use of techniques such as multilevel Pulse Amplitude Modulation (PAM) or Quadrature Amplitude Modulation (QAM) to encode several bits per transmitted symbol, thus increasing the effective transmitted data rate without increasing the symbol rate or the required bandwidth of the communication channel. To make the most efficient use possible of the available channel bandwidth, channel equalization techniques may also be used to compensate pulse dispersion and the resulting inter-symbol interference caused by the frequency-dependent attenuation and phase distortion introduced by the channel. Channel coding and coded modulation further increases bandwidth efficiency by allowing the communication system to operate at lower signal to noise ratios. For a fixed amount of noise in the channel, the ability to operate at reduced signal to noise ratios implies that the number of bits encoded in each symbol can be increased, resulting in higher bandwidth efficiency. The use of bandwidth efficient modulation techniques has resulted in practical communication systems that approach the Shannon bound for channel capacity. However so far these bandwidth efficient communications systems have been implemented at relatively low data rates, since they require complex signal processing techniques that are very difficult to implement at high speed.

In general bandwidth efficient modulation techniques have not been applied to fiber optic systems. This is so partly because the optical fibers provide so much bandwidth that, in many applications, it is unnecessary to use bandwidth efficient modulation techniques. Additionally, it has been difficult to implement bandwidth efficient modulation techniques at the data rates normally used in optical communications systems. Accordingly many optical communication systems have been based, with a few exceptions, on simple bandwidth inefficient modulation techniques. With the increasing demand for high speed communications systems, however, as the bandwidth demands increase, optical communications are reaching a point where bandwidth efficient modulation techniques will be needed. Thus the problem of how to implement complex digital signal processing (DSP) and coding algorithms at high speed needs to be solved. Furthermore, a highly cost effective way to implement these complex algorithms is in a single monolithic chip or a chip set consisting of a small number of chips, for example in CMOS (Complementary Metal Oxide Semiconductor) technology. In order to reduce cost, it is desirable to reduce as much as possible the complexity of the optical processing, even at the expense of greatly increasing the complexity of the electronic and DSP functions. As an example, it is desirable whenever possible, to replace wavelength division multiplexing (WDM) techniques, which commonly incorporate several laser light sources, by modulation, coding, and signal processing techniques that provide the same data rate over a single optical carrier. By utilizing a single optical carrier the need for optical multiplexers and demultiplexers, as well as the plurality of lasers and photodetectors inherent in WDM techniques may be eliminated.

It is also desirable to replace optical equalization techniques by DSP-based equalization techniques, in order to take advantage of electronic components which are generally less expensive than their optical counterparts. Furthermore, it is desirable to achieve high levels of chip integration, which requires that all analog processing functions, such as amplifiers, mixers, analog filters and data converters be integrated in a single chip or a small chip set. The use of techniques that lend themselves well to VLSI (Very Large Scale Integration), is highly desirable.

Commonly data rates of optical communications systems may exceed the maximum clock speeds of the digital signal processors that can be implemented in current VLSI technologies. Accordingly to process the higher data rates available in optical fibers parallel processing architectures may be employed. In general, parallel processing architectures reduce the required processing speed by partitioning computations into a set of subcomputations. The subcomputations may then be executed in parallel by assigning a separate processor to each subcomputation. Accordingly, the implementation of high-speed algorithms in a transceiver may be accomplished by an array of processors running at reduced clock speed executing tasks in parallel. To exploit the parallelism of an array of processors signal processing algorithms should be of such a nature that they may be partitioned into a number of subcomputations to be executed by the parallel processors present in the array.

An important consideration in paralyzing the computations is that the computational load of the different processors be balanced, in order to avoid bottlenecks that may result when one processor has a significantly increased processing load as compared to the other processors in the array. Not all signal processing algorithms lend themselves well to a parallel processing implementation, therefore the choice of modulation, equalization and coding algorithms must be made with the requirement of parallel processing implementation in mind.

One aspect of the present disclosure is that it may provide bandwidth efficient modulation techniques that can be applied to optical communications channels in general. These disclosed techniques may be found to be particularly advantageous in channels whose bandwidth is limited, for example as a result of the use of multimode fibers.

A further aspect of the present disclosure is in providing techniques that enable the implementation of these bandwidth efficient modulation algorithms at high speed and in the form of a single monolithic chip or a chip set consisting of a small number of chips, for example in CMOS technology.

The present disclosure also describes modulation, equalization, coding, and data conversion algorithms and architectures that lend themselves well to parallel processing implementations which may enable the reducing the clock speed of VLSI implementations. Further useful aspects of this disclosure will become apparent upon reading and understanding the present specification. Optical channels based on intensity modulation and direct detection are inherently nonlinear. This is because the modulated quantity is the optical power rather than the electromagnetic field. The principle of superposition applies to the electromagnetic field, as a result of the linear nature of Maxwell's equations, Superposition does not directly apply to the optical power. However, it has been shown that under certain very general conditions, the intensity-modulated optical channel behaves approximately linearly, and the principle of superposition can be applied. This linear approximation of an optical channel is commonly referred to as the "quasi-linear approximation". The conditions under which the "quasi-linear approximation" is valid have been analyzed in the article "Baseband Linearity and Equalization in Fiber Optic Digital Communication Systems", by S. D. Personick, appearing in the Bell System Technical Journal, Vol. 52, No. 7, September 1973, pages 1175-1194. Nonlinear distortion may occur in an optical channel when the conditions for the validity of the quasi-linear approximation do not hold. Furthermore, nonlinearities in the transmitter coupled to the fiber channel (such as laser or drive electronics non-linearities) may introduce an additional source of nonlinearity even if the quasi-linear approximation holds.

In the following discussion we assume that the quasi-linear approximation holds, and treat the optical channel as linear.

Another impairment that can exist in an optical channel is dispersion. This is a linear effect. There are different sources of dispersion in optical fibers. One type of dispersion is chromatic dispersion, caused by the dependence of the index of refraction on the wavelength of the light. If the laser is not perfectly monochromatic (as commonly happens in practice), light components of different wavelengths travel at different speeds, causing dispersion of the transmitted pulses. Commonly chromatic dispersion is small and it causes problems only in long haul optical links. Another type of dispersion is the multimode dispersion, which exists in multimode fibers. The source of this type of dispersion is that different optical fiber modes propagate at different velocities. A transmitted pulse splits its energy among many different modes. Since the light pulse carried by each mode travels at different speed, the receiver observes multiple replicas of the transmitted pulse, arriving at different times, as shown in FIG. 1A.

FIG. 1A is a graphical illustration showing a light pulse transmitted through a multimode fiber optic channel and the resulting received pulses. Pulse 101 is transmitted. Because pulse 101 travels through multiple modes in the fiber at different speeds pulses 103, 105, 107, 109 and 111 are received at the receiver. If the fiber attenuation is very small and can be neglected, the sum of the energies of all the received pulses equals the energy of the transmitted pulse. In practice, since the fiber has a nonzero attenuation, the sum of the energies of all received pulses will be less than the energy of the transmitted pulse.

As a simplified example, suppose that the transmitted pulse splits its energy equally into only two modes. Also, suppose that, as a result of the different propagation velocities of the two modes, these pulses arrive at the receiver with a time separation T, and they suffer zero loss. Then if the energy of the transmitted pulse is 1 (in arbitrary units) the two received pulses have energy 0.5 (in the same arbitrary units). Neglecting the propagation delay of the line, the impulse response of the fiber is:

$$0.5\ \delta(t)+0.5\ \delta(t-T) \quad \text{Equation (1)}$$

where $\delta(t)$ is the Dirac delta function. The Fourier transform of this impulse response is the frequency response of the optical channel and it is given by:

$$H(\omega)=\exp(-j\omega T/2)\cos(\omega T/2) \quad \text{Equation (2)}$$

Figure 1B:
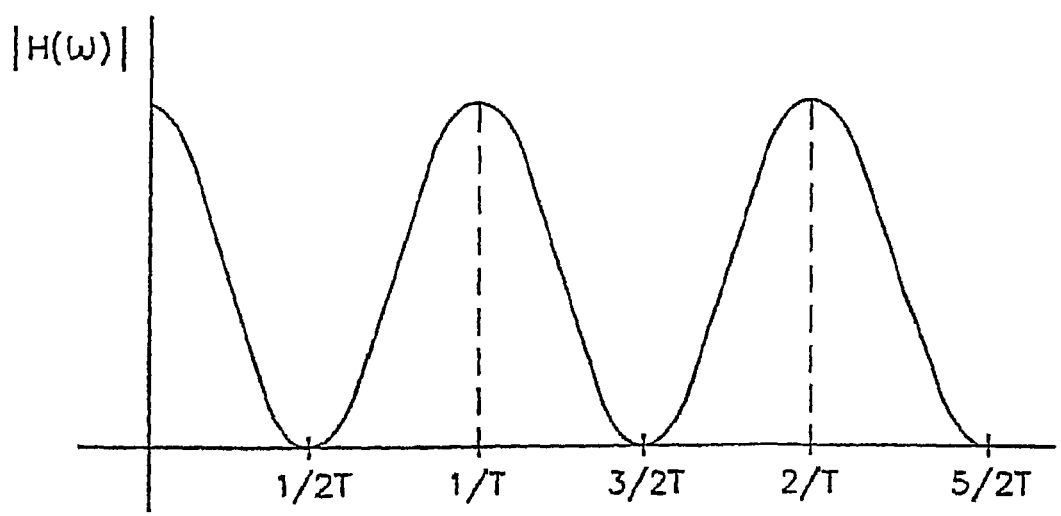
FIG. 1B is a graph of an exemplary frequency response of the optical channel exhibiting nulls.

FIG. 1B is a graph of the magnitude of the Equation (2) function. It is clear that this frequency response exhibits nulls at all odd multiples of (1/2T). This example illustrates how multimode transmission can give rise to nulls in the frequency response of the fiber. In practice multimode fiber propagates many modes, typically more than one thousand. This multimode propagation may result in rather complex impulse and frequency responses. The impulse and frequency responses are also dependent on the way the laser light is coupled to the fiber. If all modes of the fiber are excited equally, it is said that the channel is operating in "overfilled launch" conditions. This results in an impulse response that closely approximates a Gaussian function, as shown in FIG. 1C, which is a graph illustrating the response of a multimode fiber channel to an "overfilled launch."

Figure 1C:
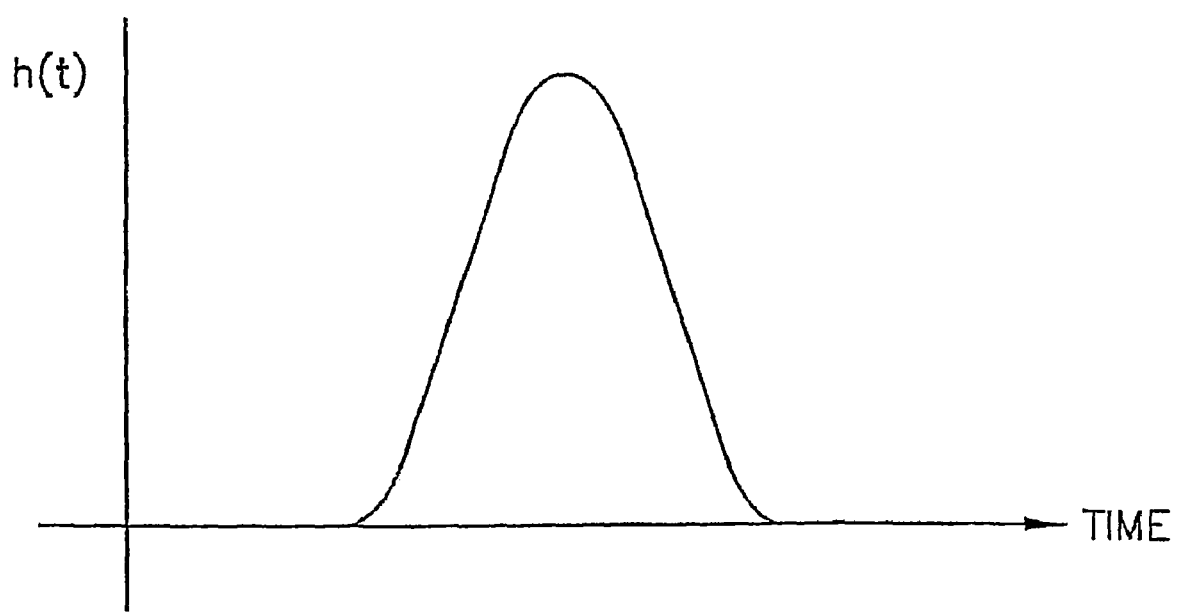
FIG. 1C is a graph illustrating the impulse response of a multimode fiber channel in an "overfilled launch conditions."

The analytic expression for the impulse response illustrated in FIG. 1C is:

$$h(t)=1/((\sqrt{2\pi})\alpha T)\exp(-t^2/2(\alpha T)^2) \quad \text{Eqn.(3)}$$

Where α a is a fiber dependant parameter. The corresponding frequency response is given by:

$$H(f)=\exp(-(2\pi\alpha Tf)^2) \quad \text{Equation (4)}$$

H(f) is also a Gaussian function, so in the case of overfilled launch conditions, the frequency response does not exhibit nulls. The 3 dB optical bandwidth is:

$$B=0.1874/(\alpha T) \quad \text{Equation (5)}$$

This is called the "overfilled bandwidth" of the multimode fiber. The overfilled bandwidth of a fiber depends on the core diameter and refraction index profile of the fiber as a function of the radius, the fiber length, and the wavelength of the laser, among other things. The bandwidth is inversely proportional to the length of the fiber, so that the product of the bandwidth times length is a constant for a given type of fiber and a given laser wavelength. For example, typical fibers in widespread use today have an overfilled bandwidth of 500 MHz·Km at a wavelength of 1310 nm, and 160 MHz·Km at a wavelength of 850 nm.

A number of alternative launch techniques such as offset launch and vortex launch have been developed in order to excite a reduced number of fiber modes. These techniques could result in increased bandwidth, but the impulse response could also show multiple peaks, as in the example of FIG. 1A. This kind of impulse response usually results in a frequency response with nulls similar to the ones shown in FIG. 1B, but with a more complicated structure. The exact shape of the frequency and impulse responses is a complicated function of the fiber characteristics and the launch conditions.

Various methods of transferring data over a fiber optic channel are known in the art. Multi-carrier modulation or MCM is one method of communicating over a fiber optic channel. In MCM, multiple carriers at different frequencies are modulated with data. The modulated carriers are then summed and the sum signal is used to modulate a laser, for example, by modulating the intensity of the laser beam.

Multi-carrier modulation systems may also be adapted for use in legacy fiber channels, which may have nulls and noisy frequency bands. Multi-channel modulators, according to embodiments of the present invention may have variable modulations and carrier frequencies. The variable modulations and carrier frequencies of MCM may be selectively chosen in order to accommodate nulls, noisy frequency bands, and other transmission impediments of existing and/or low quality channels. Nulls and noisy frequency bands can be determined in an existing channel, for example, by introducing a test signal and measuring the received result. Multi-channel modulators may also be used, in parallel, in order to upgrade existing fiber channels to virtually any capacity desired. To upgrade the capacity of existing fiber channels, multiple MCMs may be added in parallel using multiple lasers having different wavelengths. Because each laser may have its own response within the channel, each channel may undergo an initialization, in which a test signal is used to determine the frequency characteristics of the channel at that particular laser wavelength.

Existing fiber channels may be upgraded into any data-carrying capacity desired by simply adding more MCMs and multiple lasers, having different wavelengths, in parallel until the desired data-carrying capacity is achieved.

Figure 1D:
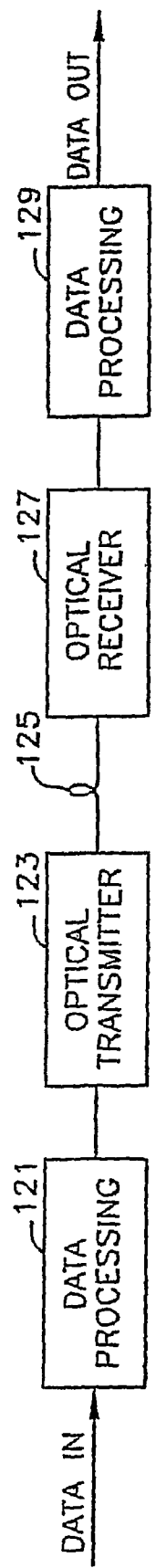
FIG. 1D is a block diagram of an exemplary fiber optic data transmission system.

FIG. 1D is a block diagram of an exemplary fiber optic data transmission system. Digital data is coupled into a data processing block 101. Data processing block 121 processes the input data and prepares it for the optical transmitter 123. The optical transmitter 123 transmits the data across a fiber optic channel 125. The optical receiver 107 accepts the data from the fiber optic channel 125 and then couples it into a data processing module 129. The data from the optical receiver 107 is processed in the data processing module 129 and then provided to the application, which will receive data.

The blocks within the block diagram of FIG. 1D may have a variety of possible implementations. For example, in a bit serial approach, the data processing block 121 may accept data and convert the data into a serial bit stream. The optical transmitter 123 may then accept the serial bit stream from the data processing block 121 and transmit as a serial type on/off keying (OOK) signal. In on/off keying a laser within the optical transmitter block 123 is ideally turned on and off depending on whether the data that is received from the data processing block 121 is a one or zero.

In practice, the laser is never turned off completely, because the turn-on time of typical lasers is relatively long, therefore the repeated turn-on transients would degrade the speed of the optical transmission system. Instead the optical power is switched between a high value (representing a discrete logic level such as a "1") and a low value (representing a discrete logic level such as a "0"). The ratio of the high to low optical power is commonly called the "extinction ratio." The laser may also be switched between several intensity levels in order to represent symbols from a logical alphabet.

For the purposes of simplifying this disclosure when two levels of optical power are transmitted the high and low levels may be referred to as on and off optical pulses, but it should be understood that an "off" pulse will typically carry a non zero amount of optical power.

In an exemplary fiber optic system according to FIG. 1, data is conveyed as a series of on/off optical pulses from the optical transmitter 123 through the fiber 125 to the optical receiver 127. The optical receiver 127 will then provide the on/off data stream to the data processing module 129. The data processing module will then convert the serial on/off stream to a data output, for example, in a parallel type format.

The blocks in FIG. 1D may also be configured in a Wavelength Division Multiplexing (WDM) approach. Wavelength division multiplexing approaches are, in general, divided into dense and coarse WDM, commonly referred to as DWDM and CWDM respectively. The wavelength division multiplexing technique employs multiple optical carriers, which are modulated by a data stream. The dense version of wavelength division multiplexing generally comprises laser carriers whose wavelengths differ by less than one nanometer. Coarse wavelength division multiplexing generally comprises laser carriers whose wavelengths differ by ten nanometers or more. Dense wavelength division multiplexing systems have been created with, for example, up to 100 different wavelengths. Such systems are expensive. A major contributing factor to the expense of wavelength division multiplexing systems is the multiple optical sources for the different wavelengths, which carry the data from the transmitter to the receiver. Additionally the expense of combining the multiple optical carriers, in WDM systems, adds to their cost. Additionally, once the data carriers arrive at the optical receiver 127 they commonly must then be optically split, in order to retrieve the data streams from the individual optical carriers.

It is desirable, from a cost standpoint, to employ a single optical transmitter 123 and a single optic receiver 127 if possible. It is also desirable that the optical transmitter 123 and optical receiver 127 be as simple as possible and any processing accomplished in the electronic data processing blocks 121 and 129. In a preferred embodiment of the present invention, data processing block 121 as well as data processing block 129 comprise a single integrated circuit each. By transferring all functions except those used for the actual optical transmission into, for example, a CMOS (Complementary Metal Oxide Semiconductor) integrated circuit, a low cost implementation of the transmit side of the system in FIG. 1 can be realized. Likewise, if the optical receiver 127 is restricted to those components needed for optical reception and all other functions are performed within the data processing block 129, (for example a CMOS integrated circuit), the costs for the received portion of this circuitry of FIG. 1 can be minimized. Once such embodiment of a multi-carrier modulation transmitter, which can be integrated into a single CMOS circuit, is illustrated in FIG. 2.

Figure 2A:
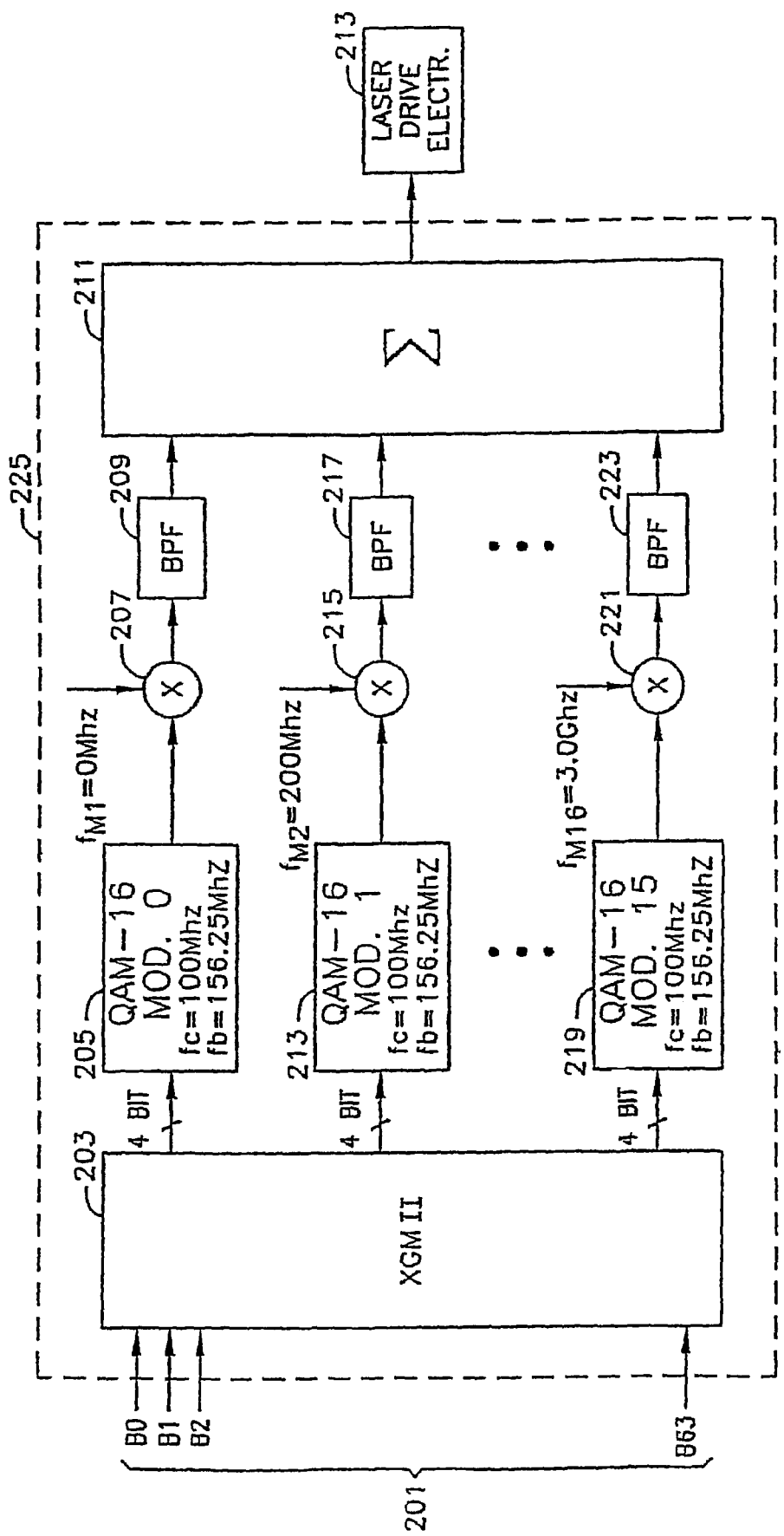
FIG. 2A is a block diagram of a multi-carrier modulation (MCM) transmitter.

FIG. 2A is a block diagram of a multi-carrier modulation transmitter. The illustrative MCM transmitter of FIG. 2A has a capacity of 10 gigabits/second. In FIG. 2, 64 bits of data 201 are coupled into a XGMII (Ten Gigabit Media Independent Interface) module 203. The XGMII is shown as providing a 64 bit input or output at a clock rate of 156.25 MHz. In reality the XGMII interface operates on 32 bits at a time, and is clocked on both the rising and the falling edges of the 156.25 MHz clock. A complete description of the XGMII interface is given in the presentation "10 Gig MII Update" by H. Frazier, presented at thee IEEE 802.3 High Speed Study Group Plenary meeting in Kauai, Hi., on Nov. 9, 1999. A copy of this presentation can be obtained from the IEEE 802.3 web site, at:

http://grouper.ieee.org/groups/802/3/10G_study/public/nov99/frazier_1_1199.pdf.

Other system interfaces besides the XGMII have been under consideration by the IEEE802.3ae Task Force, and will likely be included in the standard. One important alternative interface is the XAUI interface, described in the document:

http:grouper.ieee.org/groups/802/3/ae/public/may00/taborek_2_0500.pdf

Those skilled in the art will recognize that the interfaces illustrated within this disclosure are by way of example and are chosen as examples likely to be familiar to those skilled in the art. Other interfaces may also be used. The uses of the exemplary interfaces within this disclosure are in no way meant to limit the inventive concepts to those interfaces and serve the purpose of illustration and example only.

The 64 bits are then divided into four bit nibbles and further provided to the modulators. Modulator zero, 205 is a QAM-16 (Quadrature Amplitude Modulation) module. The QAM-16 module 205 accepts four bits of data from the XGMII module 203. The frequency that is mixed with the output of the QAM-16 modulator in mixer 207 is zero megahertz. After the mixing stage 207, the signal is bandpass filtered in block 209 to remove any undesirable components.

The filtered signal is then coupled into a combiner 211. Similarly, the second four bits from the module 203 are coupled into QAM modulator 213. The output of the QAM-16 modulator 213 is coupled into a mixer 215 where it is mixed with a 200 megahertz signal. The resultant signal is then bandpass filtered, in bandpass filter 217, and coupled into the combiner 211. The signals which are coupled into the combiner 211 from bandpass filter 217, occupies a frequency bandwidth from 200 megahertz to 356.25 megahertz. Each mixer within the exemplary multi-carrier modulation block diagram illustrated in FIG. 2 has a frequency which is separated from successive mixer frequency by 200 megahertz. In such a way by having the bandpass less than the separation of mixing frequencies may minimize the crosstalk between the modulators.

In the final stage, four bits are coupled from the XGMII modulator 203 into the final QAM-16 modulator 219. The frequency of modulation, which is coupled into mixer 221, is 3.0 gigahertz. The output of mixer 221 is then coupled into bandpass filter 223 to remove any unwanted components. The filtered signal is then coupled from the bandpass filter 223 into the combiner 211. The combiner 211 combines all the modulated frequency bands into a single frequency spectrum. The frequency spectrum signal is then further coupled to laser drive electronics 213. The output of the laser drive electronics 213, is an intensity modulated signal corresponding to the combination of all 16 modulators. All of the electronics illustrated in FIG. 2 and encompassed within the dotted line 225 may be integrated into a single integrated circuit, for example a CMOS integrated circuit chip. By integrating all the electronics within the block 225 on a single chip, the system cost may be reduced. By placing as much of the processing as possible within the integrated circuit 225, costs of assembly, alignment and multiple optical parts may be greatly reduced.

Figure 2B:
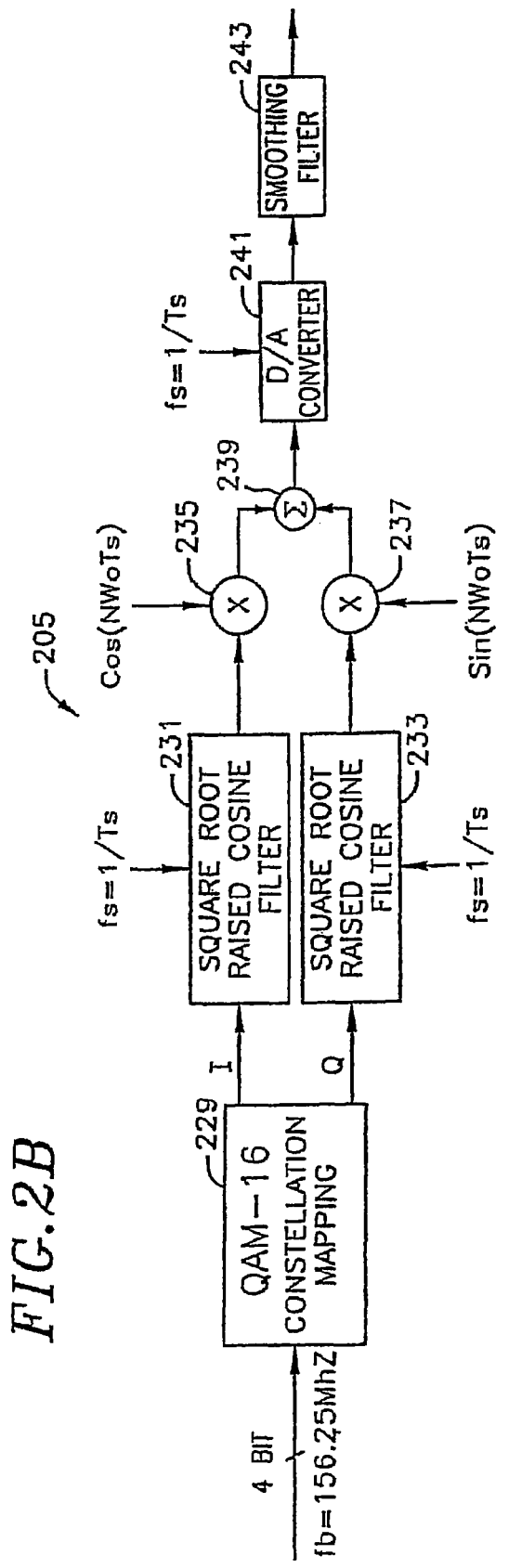
FIG. 2B is a block diagram of a digital implementation of a QAM-16 modulator, such as illustrated in FIG. 2A.

FIG. 2B is a block diagram of a digital implementation of a QAM-16 modulator; such as illustrated in FIG. 2A. The QAM 16 Mapping block 229 accepts a four bit input signal at a frequency of 156.25 MHz. The QAM 16 Mapping block 229 then maps the four input bits into I (inphase) and Q (quadrature) representations of the input bits received The I and Q values are then provided to Square Root Raised Cosine Filters 231 and 233 respectively. The sampling frequency $f_s$ of Square Root Raised Cosine Filters 231 and 233 is typically three times the symbol rate or higher (in the present example 468.75 Mhz or higher). Because of the DSP based implementation, the carrier frequency $\omega_0 = 2\pi f_0$ must be limited to a relatively low value such as 100 Mhz. Higher carrier frequencies would require an increase in the sampling frequency $f_s$ of the square root raised cosine filters and D/A Converters making the implementation difficult. The signals are then multiplied in blocks 235 and 237 and summed in block 239. The summed value is then coupled into a Digital to Analog converter 241, and then further into a smoothing filter prior to the coupling of the signal to the mixer (e.g. 207).

FIG. 2C is a block diagram of an analog implementation of a QAM-16 modulator, such as illustrated in FIG. 2A. The QAM 16 Mapping block 229 accepts a four bit input signal at a frequency of 156.25 MHz. The QAM 16 Mapping block 229 then maps the four input bits into I (inphase) and Q (quadrature) representations of the input bits received The I and Q values are then provided to Square Root Raised Cosine Filters 231 and 233 respectively. The outputs of the Square Root Raised Cosine Filters 231 and 233 are then coupled into D/A converters 245 and 247, then further provided to smoothing filters 249 and 251, prior to being mixed in mixers 253 and 255, and then further combined in 257. In this approach the modulation can be done at the carrier frequency directly fc directly, avoiding the need of the mixer and bandpass filter. However, this approach requires that the amplitude and phase of the I and Q carriers cos($\omega$ct) and sin($\omega$ct) be very accurate.

Figure 3:
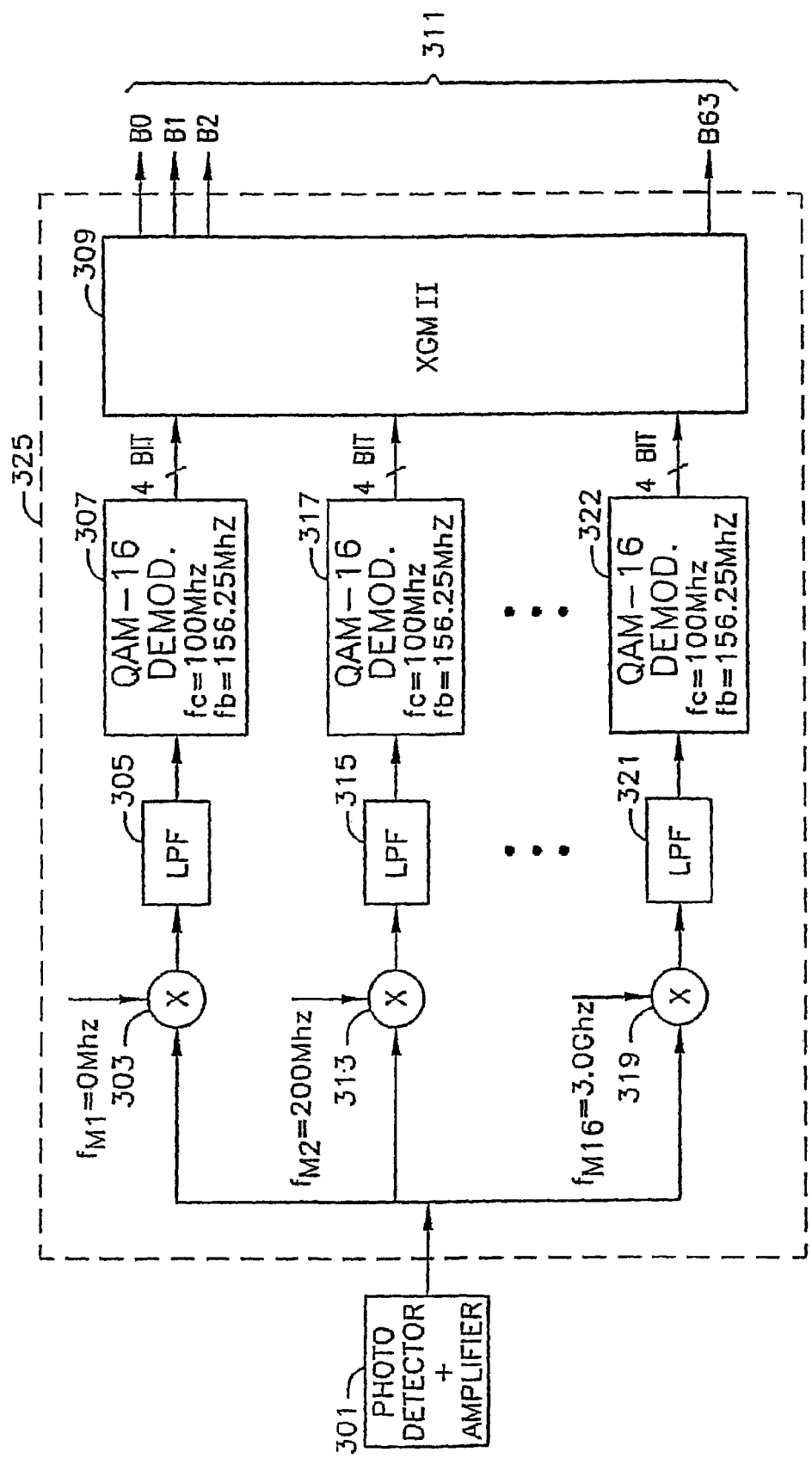
FIG. 3 is a block diagram illustrating a multi-carrier modulation receiver.

FIG. 3 is a block diagram of a MCM receiver. The signal from the laser drive electronics 213 is provided to a laser, for example a solid state laser. The output of the laser is coupled to a fiber optic channel. The output of the fiber optic channel is provided to a photo detector and amplifier 301. The photo detector and amplifier 301 converts the optical signal into a voltage level. The photo detector and amplifier 301 then couples the amplitude modulated signal into a series of mixers. The output of the photo detector and amplifier 301 corresponds to the output of the combining circuit 211. The first mixer 303 mixes the incoming signal with zero megahertz. In other words, the signal is basically coupled into a low pass filter 305. A mixer 303 is illustrated even though no mixing is occurring because, in other embodiments of the MCM system, a first mixer, such as 303, may provide a programmable mixing function. Low pass filter 305 filters the incoming signal and provides a baseband frequency signal to a QAM-16 demodulator 307. The QAM-16 demodulator demodulates the baseband signal provided to it by the low pass filter 305. The output of the QAM 16 demodulator is a four bit data signal which is then provided to the XGMII 309. Similarly, the second mixer 313 accepts the amplitude modulated signal from the photo detector and amplifier 301. The signal is then mixed with a 200 megahertz mixer signal which translates a portion of the signal bandpass, corresponding to 200 to 400 megahertz, into a baseband signal. The baseband signal is filtered in the low pass filter 315 thereby eliminating other unwanted, non-baseband signals. The output of the low pass filter is then coupled into a QAM-16 demodulator 317. The output of the QAM-16 demodulator 317 is a four bit symbol which is coupled into the XGMII 309.

Additional mixers (e.g. 303 and 313) are provided with mixing signals separated by 200 megahertz. The $16^{th}$ mixer 319 accepts the bandpass signal from the photo detector and amplifier 301, and mixes it with a three gigahertz signal. The output of the mixer 319 is then coupled into a low pass filter 321. The low pass filter 321 passes the resulting baseband signal and provides it to the QAM-16 demodulator 322. The QAM-16 demodulator demodulates the signal into a four bit data signal. The four bit symbol is then coupled into the XGMII (Ten Gigabit Media Independent Interface) unit 309. The XGMII combines all 16 input symbols provided to it to produces a stream 311 64 bits wide.

Figure 4:
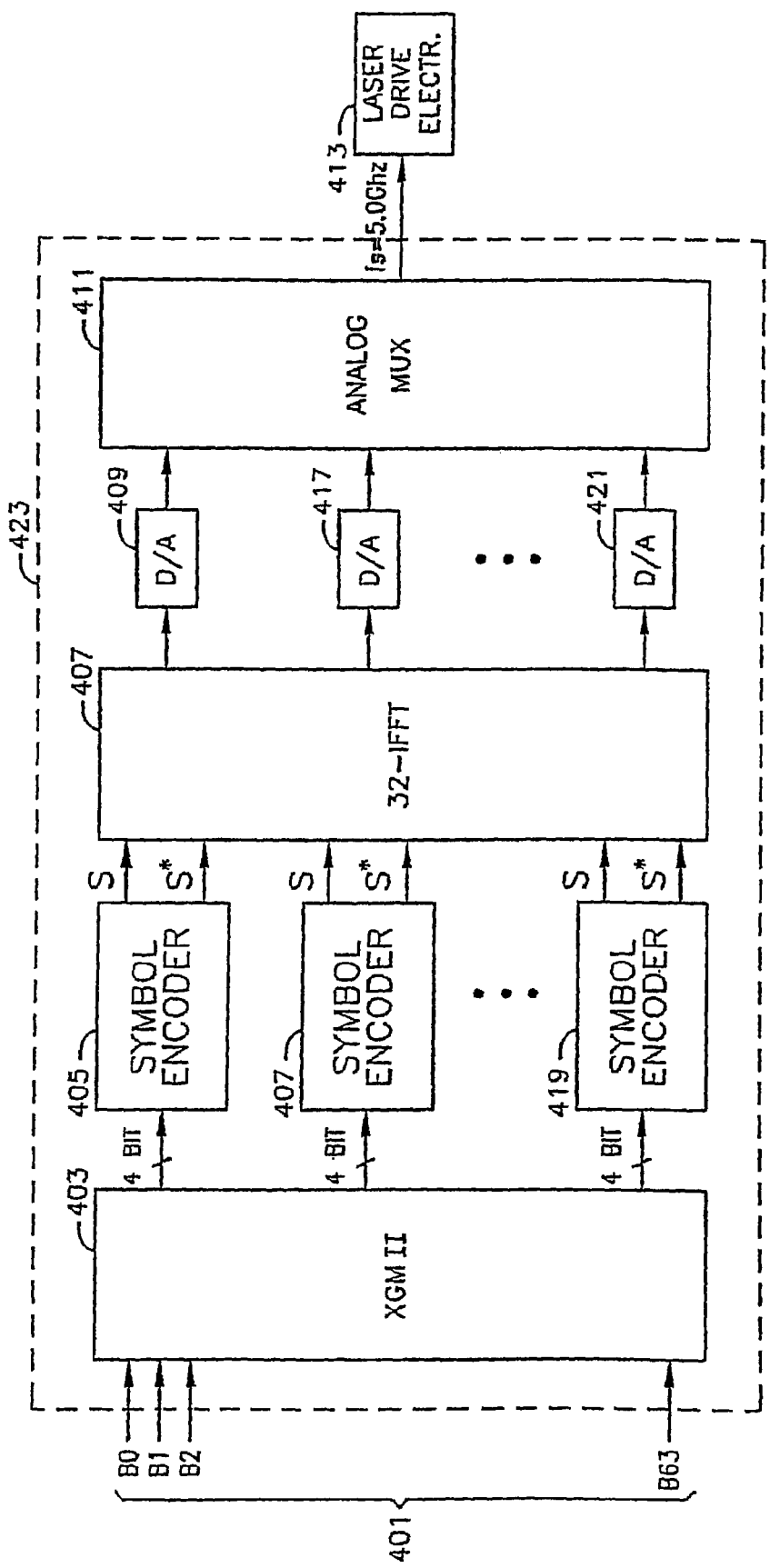
FIG. 4 is a block diagram of an alternate implementation of a multi-carrier modulation transmitter.

FIG. 4 is a block diagram of an alternative implementation of a multi-carrier transmitter. In FIG. 4, a 64 bit wide digital signal 401 is coupled into a XGMII 403. The XGMII interface separates the bits into four bit groups. Each four bit group is coupled into an assembling coder, for example, 405, 415 or 419. The output of each symbol encoder is then coupled into an inverse fast Fourier transform block 407. Digital to analog converters for example, 409, 417 and 421 convert the output of the inverse fast Fourier transform (IFFT) block 407 into analog samples. The analog samples are then coupled into an analog multiplexer 411 with a sampling frequency of five gigahertz. The analog multiplexer multiplexes all analog signals into a single waveform comprising successive samples. The analog waveform is then coupled into laser drive electronics 413 and is used to modulate the laser intensity using drive electronics 413. The implementation illustrated in FIG. 4 may be integrated into one integrated circuit device 423 capable of accepting a 64 bit wide digital bit stream. In the present embodiment, the 64 bit wide digital signal stream has a frequency of 156.25 megahertz resulting in an overall data carrying capacity of 10 gigabits per second. The laser drive electronics 413 intensity modulates the laser beam, which is then coupled into a fiber optic channel. The other end of the fiber optic channel is then coupled into the photo detector and amplifier 501 of the receiver module, for example, as illustrated in FIG. 5.

Figure 5:
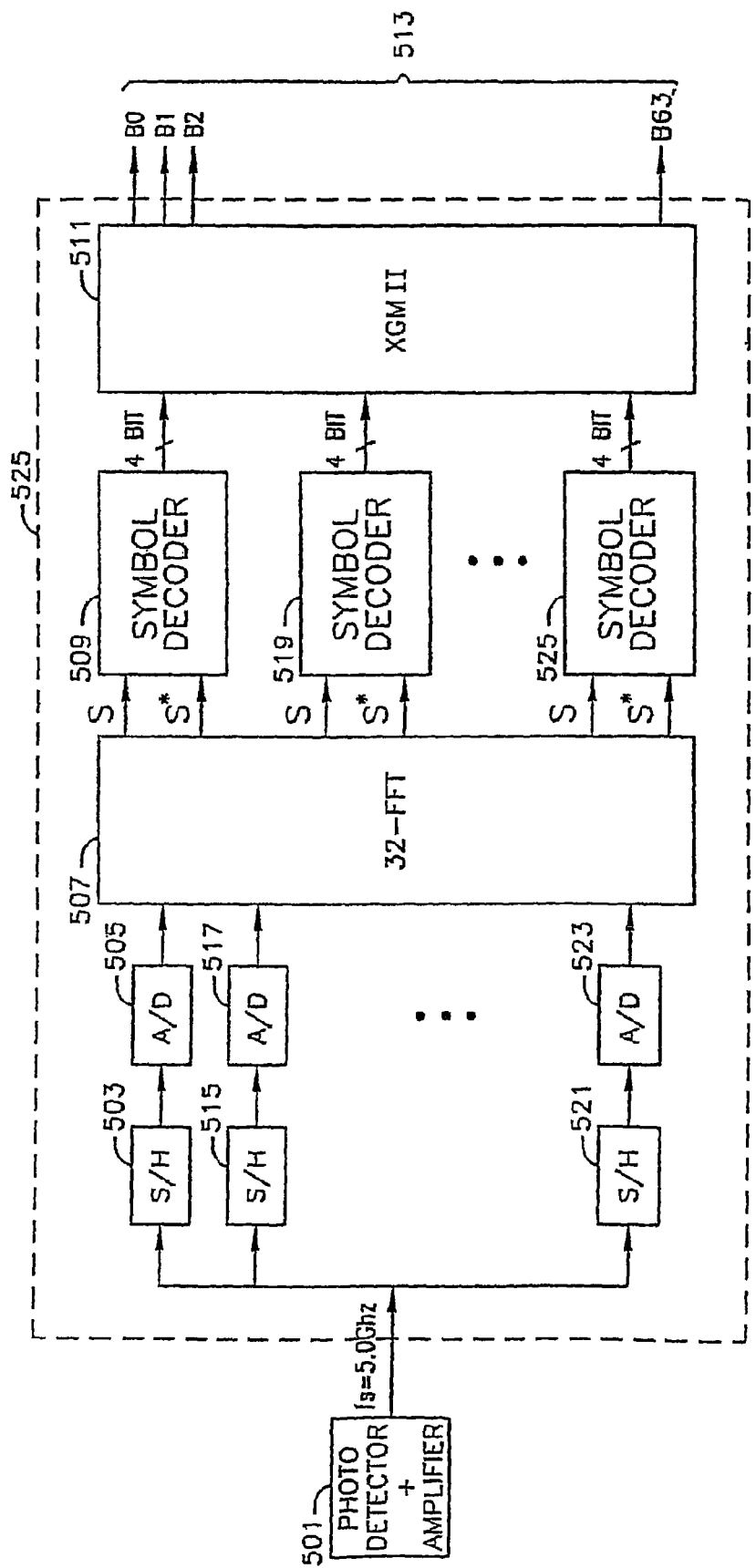
FIG. 5 is a block diagram of an alternate implementation of multi-carrier modulation receiver as may be used the alternative implementation of the MCM transmitter illustrated in FIG. 4.

FIG. 5 is a block diagram of an alternate implementation of multi-carrier modulation receiver, corresponding to the alternative implementation of multi-carrier modulation transmitter illustrated in FIG. 4. The photo detector and amplifier 501 receive the multi-carrier modulated signal from the fiber optic and convert it into an electrical signal. The resulting electrical signal from photo detector and amplifier 501 is coupled into an array of sample and hold circuits, for example sample and holds 503, 515 and 521. The sample and hold circuit samples successive values in the input waveform. The output of the sample and hold circuits are then coupled into analog to digital converters such as for example 505, 517 and 523. The digital outputs from the analog to digital converters are further coupled into a fast Fourier transform module 507. The sequence of symbols which comprise the output of the fast Fourier transform block 507 are coupled into symbol decoders, for example, 509, 519 and 525. The output of each symbol decoder is a set of four data bits. The set, of four bits from each symbol decoder is coupled into the XGMII interface 511. The XGMII interface 511 receives the four bit input from the symbol decoders and forms a 64 bit parallel output. The 64 bit parallel output from the XGMII is clocked out at a frequency of 156.25 megahertz. The output of the XGMII therefore represents a 10 gigabit per second digital data stream. The entire receiver represented by the block 525 can be integrated within a single integrated circuit, such as a CMOS integrated circuit.

The transmission techniques illustrated in FIGS. 2, 3, 4 and 5 can provide for 10 gigabits per second data transmission at a symbol rate of 156.25 megahertz by utilizing the intrinsic parallelism present in the sub-carrier multiplexing technique.

If a non-parallel method were used to transmit 10 gigabits per second at a symbol rate of 156.25 megahertz, 64 bits per symbol would be required to achieve the 10 gigabit per second data rate. This would result in a modulation constellation of astronomical complexity and low noise immunity. Even if the symbol rate was quadrupled to 625 megahertz, a 65,536 QAM constellation would be required. In addition, because the 156.25 megahertz rate is relatively low, multi-carrier modulation is robust and multi-path propagation effects, such as multi-mode dispersion in fibers, is minimized due to the low transmission frequency. Those skilled in the art will recognize that the multi-carrier modulation technique just described is exemplary. Many variations of individual bandpasses, modulation constellations and carrier frequencies are possible within the scope of the inventive concepts of this disclosure.

The multi-carrier modulation concepts illustrated in FIGS. 2, 3, 4, and 5 may also be used to increase the data rate within current deployed fiber networks. A difficulty that may be encountered with current fiber networks is that some of the fibers used in current fiber channels may be of lesser quality.

Figure 10:
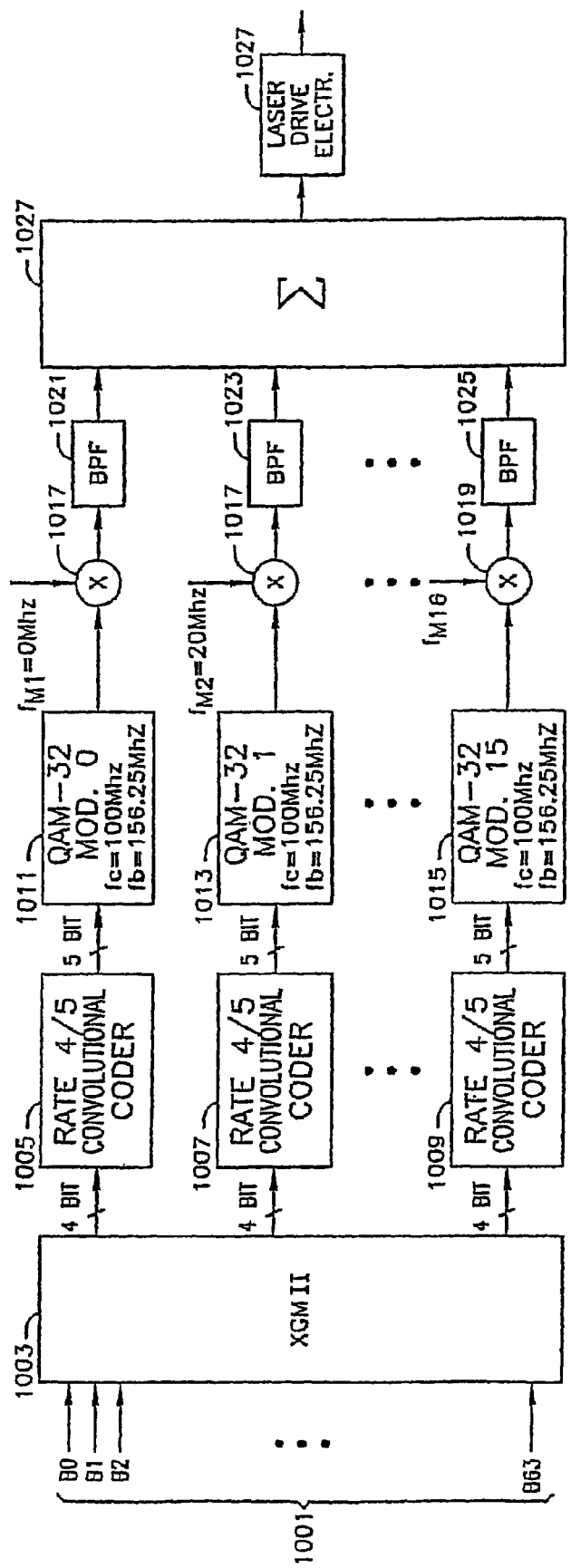
FIG. 10 is a block diagram illustrating a modification of the transmitter of FIG. 2A to incorporate trellis coding.
Figure 11:
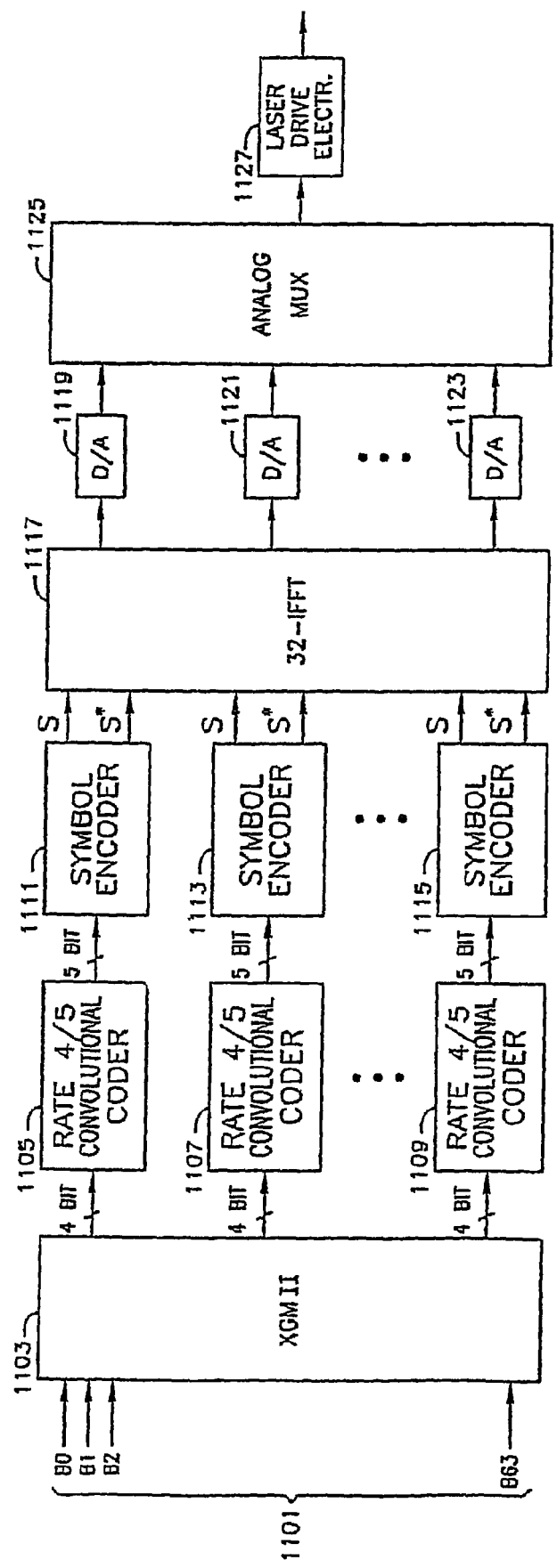
FIG. 11 is a block diagram illustrating a modification of the alternate transmitter of FIG. 4 to incorporate trellis coding.
Figure 12:
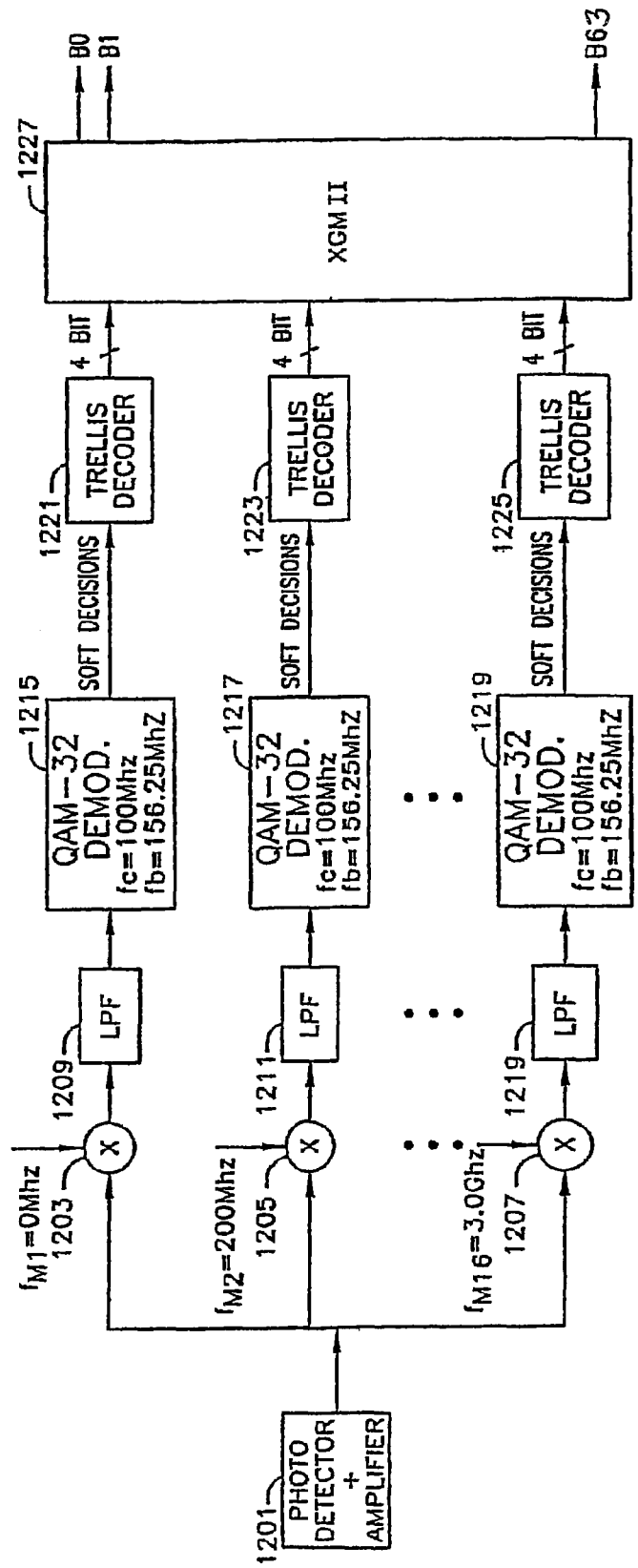
FIG. 12 is a block diagram illustrating a modification of the receiver of FIG. 3 to receive a trellis coded signal.
Figure 13:
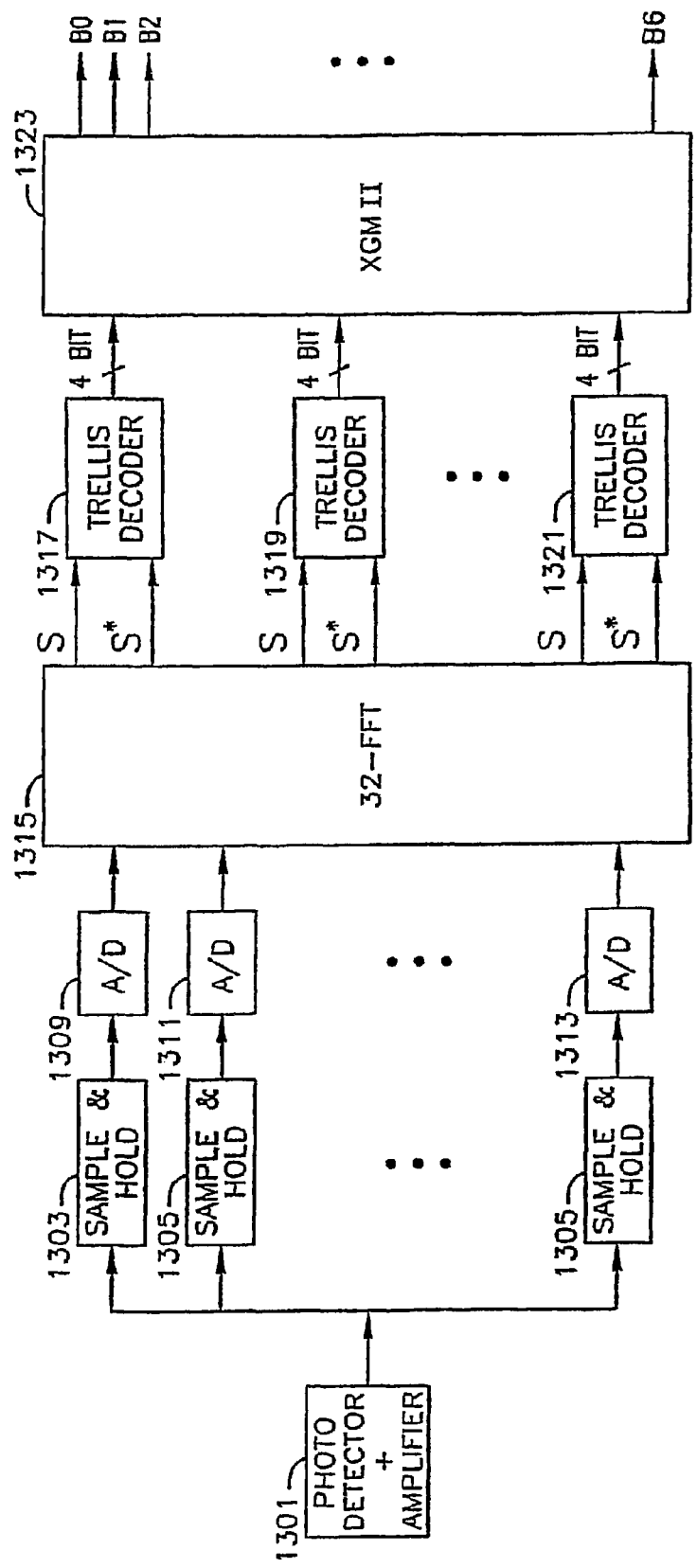
FIG. 13 is a block diagram illustrating a modification of the receiver of FIG. 4 to receive a trellis coded signal.

FIG. 10 shows a modification of the transmitter of FIG. 2A that incorporates trellis coding. The 4-bit input from the XGMII block is passed to a rate 5/4 convolutional coder. The 5-bit output from the convolutional coder is modulated using a QAM-32 modulator. Trellis coding requires an expanded constellation, but does not increase the symbol rate of the QAM modulator or the bandwidth of the modulated signal. The same idea can be applied to the alternative transmitter implementation of FIG. 4. This is shown in FIG. 11. The modified receivers incorporating trellis decoders for the implementations of FIGS. 3 and 5 are shown in FIGS. 12 and 13 respectively. The use of trellis coding results in increased robustness and decreased error rate in the presence of noise and other channel impairments. While FIGS. 10 through 13 show particular embodiments of trellis coding and decoding for an optical communications transceiver, it will be clear to anyone skilled in the art that many alternative embodiments are possible without departing from the spirit and scope of the present invention.

Those fiber channels may exhibit channel anomalies such as deep nulls, particularly in the case of fibers with multi-mode dispersion. Such nulls are illustrated in FIG. 6.

Figure 6:
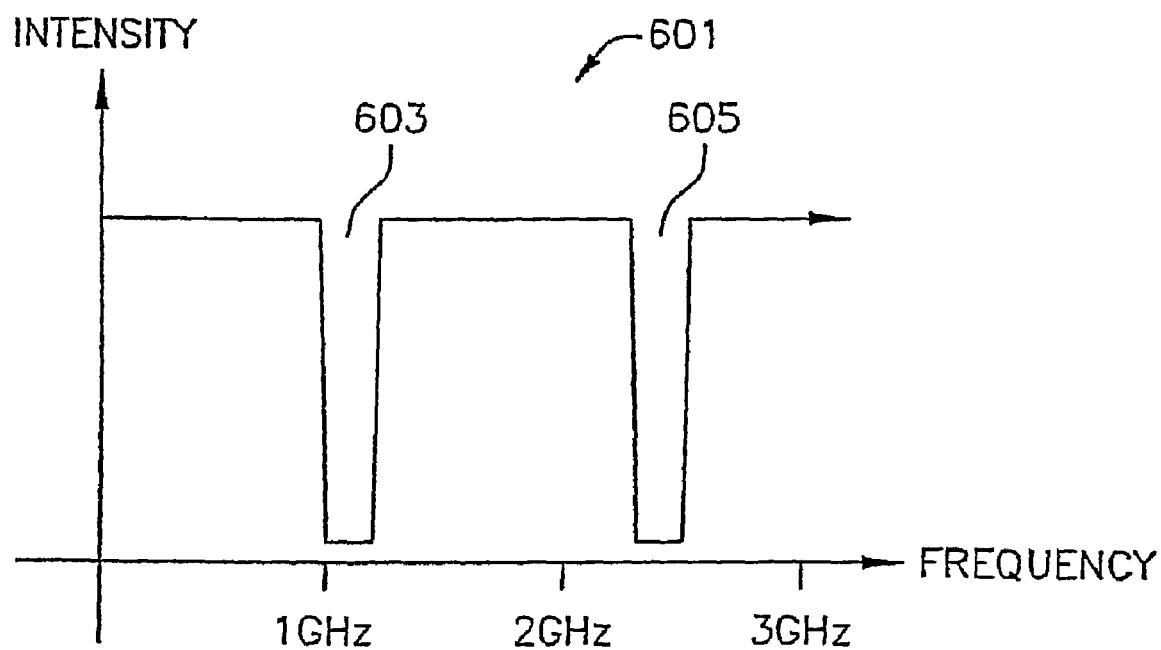
FIG. 6 is a graph of intensity vs. frequency representing the transfer function of an exemplary fiber optic channel.

FIG. 6 is a graph of intensity versus frequency representing the transfer function of an exemplary fiber optic system. The ideal response is linear, that is the transmitted intensity does not vary as the laser light output is modulated at different frequencies. However fiber optic systems, particularly those exhibiting multi-mode interference, may exhibit nulls such as 603 and 605. The nulls 603 and 605 may be due in part to a large number of different factors such as multi-mode dispersion within the fiber, imperfect coupling of the fiber to the light source, frequency response of driver electronics and a variety of other factors.

Figure 7A:
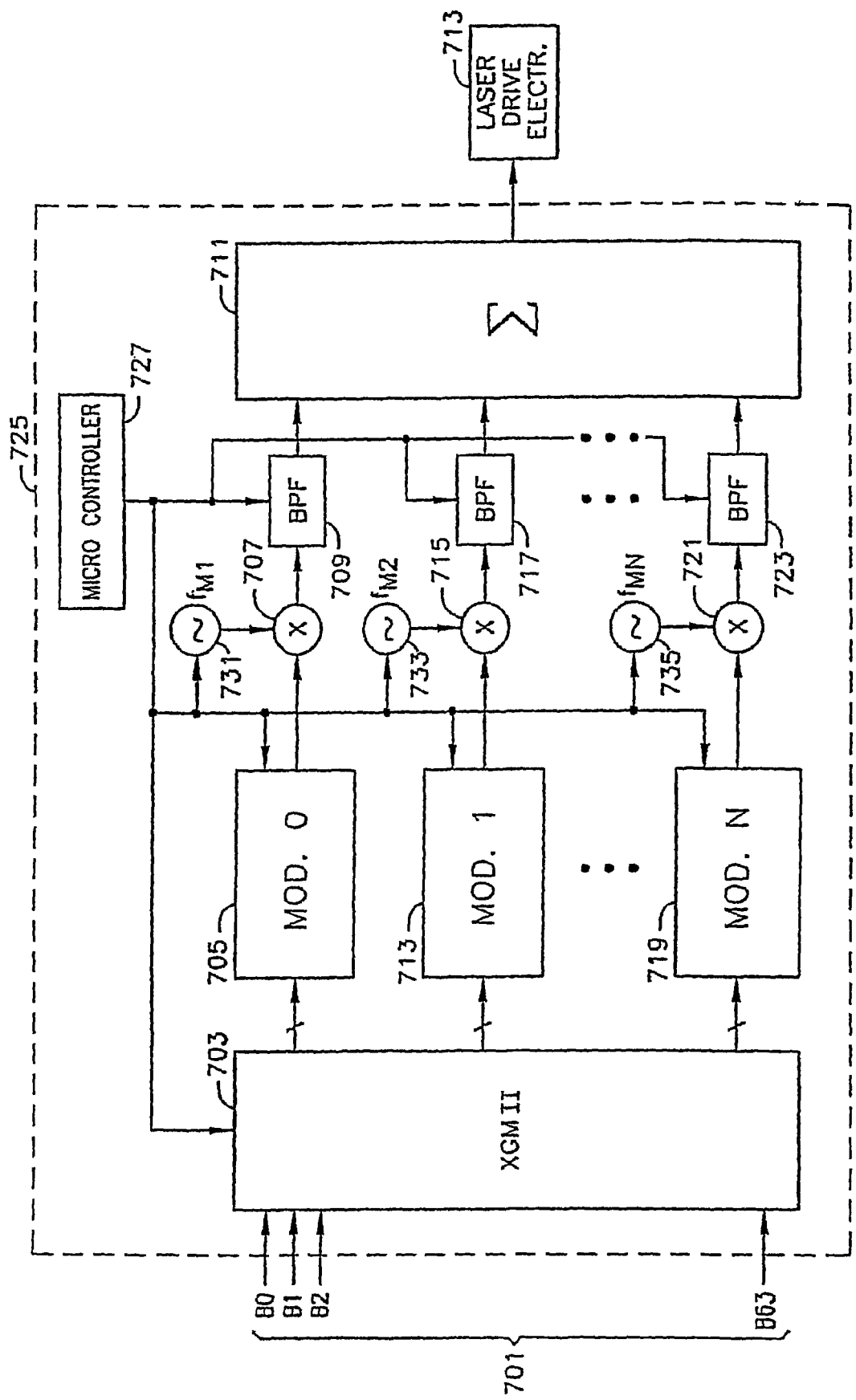
FIG. 7A is a block diagram of a circuit implementation as may be used with fiber channels exhibiting nulls and/or noisy bands.

FIG. 7A is a block diagram of a circuit implementation, as may be used with fiber channels exhibiting nulls, noise and/or frequency roll off. In FIG. 7, a parallel bit stream 701 comprising bits 0 through 63 is coupled into a XGMII interface. The XGMII interface is controlled by a micro controller 727 through a controlling bus 729, such as an I$^2$C bus. The control bus 729 controls the XGMII controller so that the number of bits which are provided to each modulator such as 705, 713 and 719, are variable. Additionally, the micro controller 727 using the control bus 729 may control the modulation constellations of the modulators within the system. The control bus may also control the modulation frequencies such as 731, 733 and 735 which are applied to mixer 707, 715 and 721, respectively. The micro controller 727 may also control the bandpass filters such as 709, 717 and 723. The micro controller 727 may control the system variables so that the mapping of data from the input 701 through the modulators and frequency bands avoids fiber channel anomalies such as nulls within the optic system, for example the nulls illustrated at 603 and 605 of FIG. 6.

In order to configure the circuit 225 to avoid nulls and to match the noise response of the channel the configuration of the transmitter can be arranged to match the transfer characteristics of the fiber channel. To arrange the configuration of the transmitter the transfer characteristics of, the fiber channel characteristics need to be determined. Such a process to determine the frequency response of the fiber channel is illustrated in FIG. 7B.

Figure 7B:
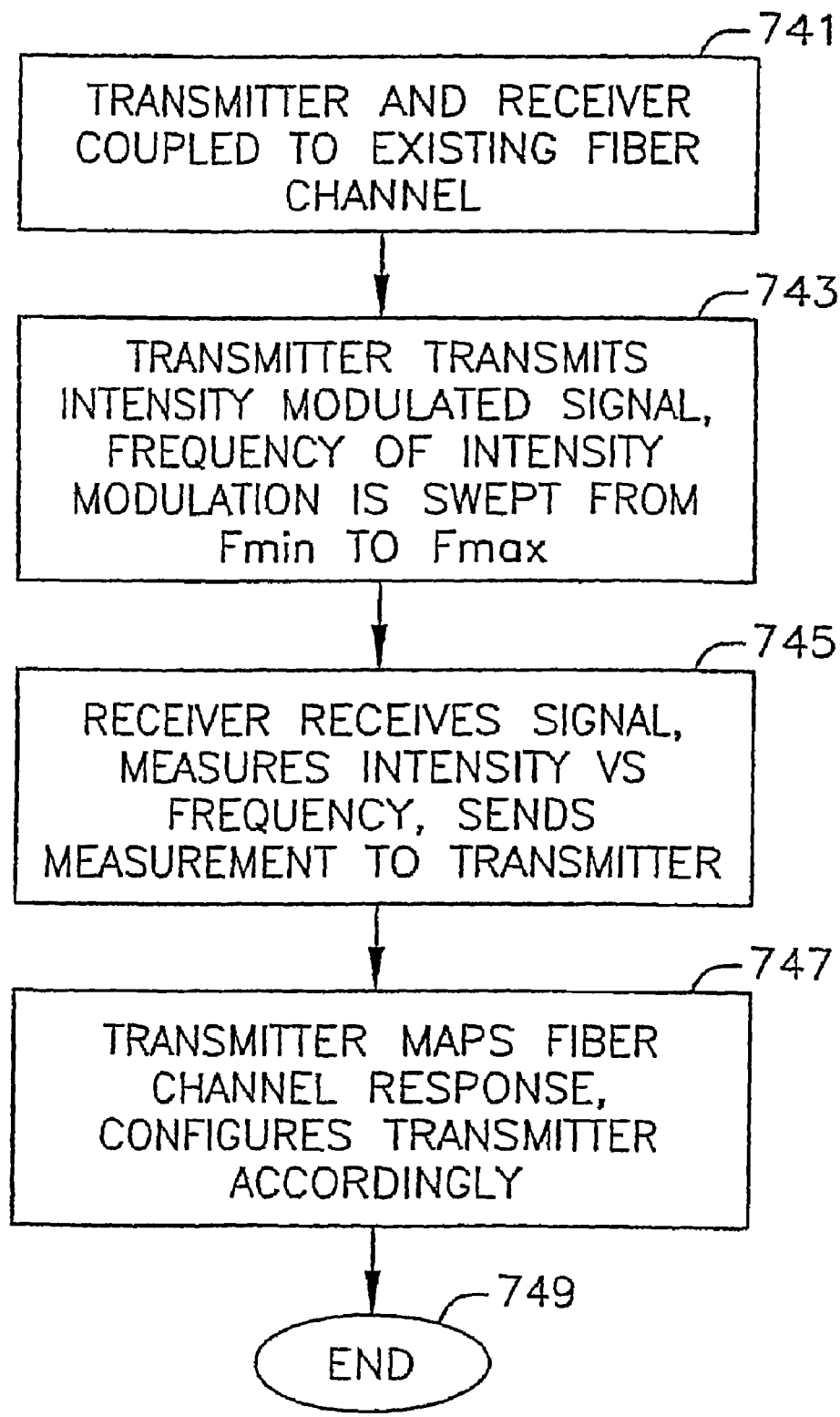
FIG. 7B is a flow diagram illustrating the process by which an existing fiber channel may be characterized.

FIG. 7B is a flow diagram illustrating the process by which the transfer characteristics of a fiber channel may be mapped. The process begins in block number 741 when the transmitter and receiver are coupled to a fiber channel. In block 743, the transmitter then transmits an intensity modulated signal, preferably having a flat frequency characteristic, in which the frequency of intensity is swept from the minimum frequency, to be used on the channel, to the maximum frequency, to be used on the channel. In block 745, the receiver receives the signal and measures intensity versus frequency. This measurement of intensity versus frequency between the frequencies of $F_{min}$ and $F_{max}$ will characterize the frequency transfer characteristic of the fiber channel. The measurements of intensity versus frequency are then communicated from the receiver to the transmitter. In block 747 the transmitter maps the fiber channel response onto the circuitry of the transmitter. The process then ends in block 749.

As an illustration of configuring the transmitter according to the fiber channel response, FIG. 2A is compared with FIG. 7A. In FIG. 2, for example, modulator 213 receives a four bit value. Modulator 213 utilizes a QAM-16 modulator. The carrier frequency is 100 megahertz and the bit rate is 156.25 megahertz. The bandpass filter 217 is then set to a value of 0 to 200 megahertz. The other modulators and bandpass filters could be similarly set according to channel characteristics.

Figure 8:
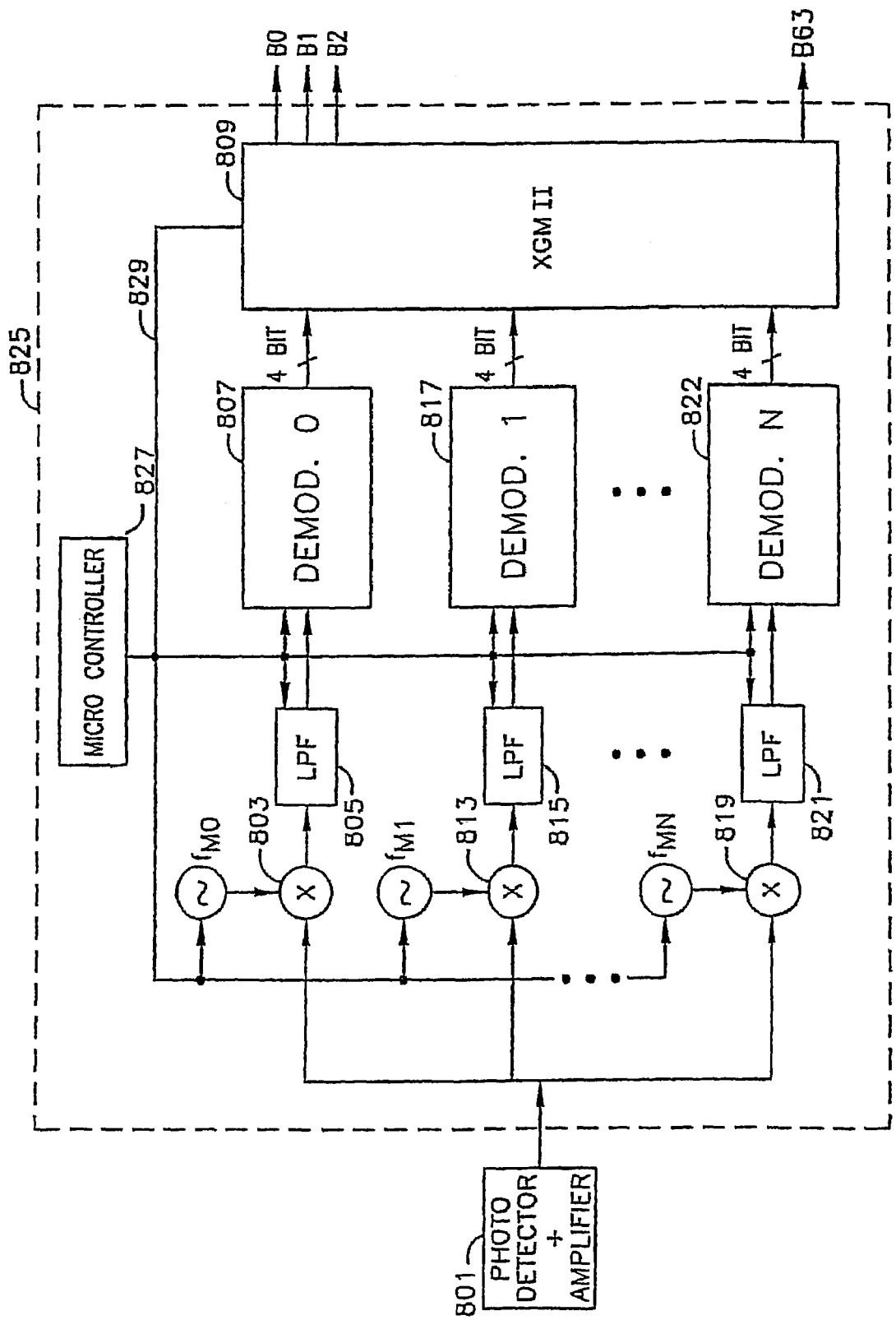
FIG. 8 is a block diagram of a receiver as may be used with the transmitter illustrated in FIG. 7A.

If for instance one half of the 200 megahertz baseband frequency of the bandpass filter 217 corresponded to a null within the fiber optic channel, the null could be compensated for (as shown in FIG. 7A) by reducing the symbol rate rw modulator 713. Modulator 713 would then only accept 2 bits of data from the XGMII interface 703 at a time. The micro controller 727 could program the XGMII 703 to couple only 2 bits at a time into modulator 713. If on the other hand, the particular band corresponding to modulation frequency two were exceptionally free of noise, the XGMII could be controlled by the micro controller 727 to couple five bits into modulator 713 and QAM-32 could be used within modulator 213. Similarly, the bandwidths of the carriers could be adjusted to be wider or narrower and carry more or less information depending on the characteristics of the fiber channel. The mapping, of course, would have to be communicated either explicitly or implicitly to the receiver in order for the data stream communicated to be properly decoded. FIG. 8 is an example of a multi-carrier modulation receiver that may be used with the transmitter illustrated in FIG. 7A.

FIG. 8 is a block diagram of a receiver as may be used with the transmitter illustrated in FIG. 7A. In FIG. 8 the photo detector and amplifier 801 receives a signal from the fiber channel. The receiver 825 has been configured to match the transmitter 725 in FIG. 7A. The receiver in FIG. 8 may be configured in a variety of ways. The receiver illustrated in FIG. 8 may be configured explicitly by receiving a mapping of the channel transfer characteristic from the transmitter. The receiver in FIG. 8 may be also mapped implicitly by having the same mapping algorithm within the micro controller 827 as within the micro controller 727. Because the mapping of the frequency characteristics of the fiber channel is accomplished by sending a signal from the transmitter to the receiver and the receiver sending the characteristics of the fiber channel to the transmitter, the receiver already knows the characteristics of the fiber channel because of the signal received from the transmitter. If the same algorithm for mapping modulation, mixer frequencies and bandpass filter widths are used within the receiver as within the transmitter the configuration of the transmitter need not be expressly communicated to the receiver only the overall response of the channel need be communicated. For example, after the frequency response of the channel dictated that 2 bits would be coupled into modulate 713 at a time, the same algorithm within micro controller 827 would configure demodulator two block number 817 as an 8PSK demodulator. Alternately, the configuration from the transmitter circuit may be communicated to the receiver circuit explicitly on start up. By using the transmitter in FIG. 7A, mapping the fiber channel and communicating the mapping to similarly configure a receiver as illustrated in FIG. 8, the capacity of any existing fiber channel, no matter the characteristic, can be accommodated. Additionally, the system illustrated in FIG. 7A and FIG. 8 may be extended through the use of multiple wavelength lasers and parallel MCM transmitter receiver pairs. For example, an existing fiber can have two laser beams coupled through it to communicate between a sending end and a receiving end. Such a system is illustrated in FIG. 9.

Figure 9:
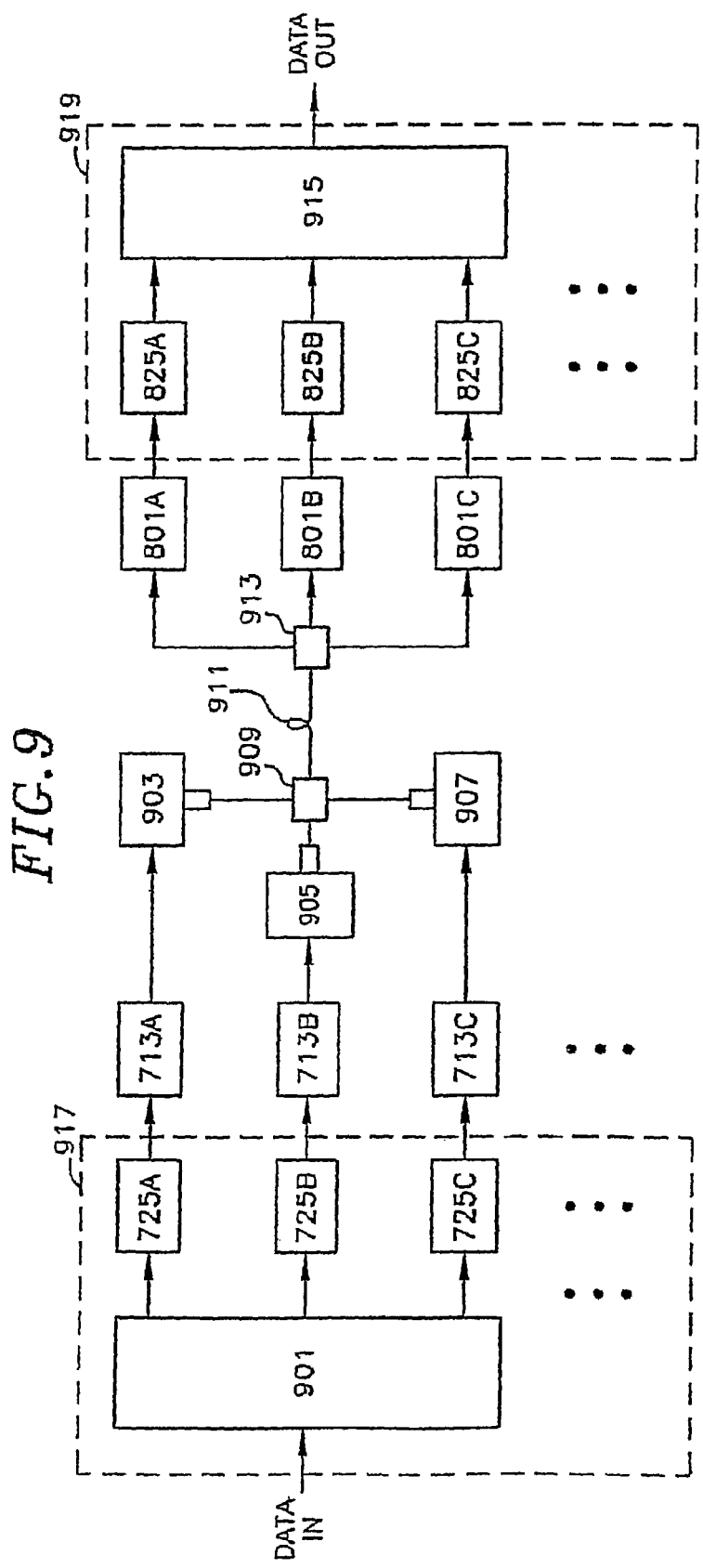
FIG. 9 is a block diagram illustrating the use of a set of multi-carrier modulation transmitters and multi-carrier modulation receivers in parallel in order to increase the data-carrying capacity of a channel.

FIG. 9 is a block diagram illustrating the use of a set of three multi-carrier modulation transmitters and three corresponding multi-carrier modulation receivers used in parallel in order to increase the data carrying capacity of the illustrated fiber channel. In FIG. 9, three multi-carrier modulation transmitters 725A, 725B and 725C are employed in order to intensity modulate the beams of three lasers 903, 905 and 907. The embodiment of FIG. 9 is by way of illustration and example only. The number of multi-carrier modulation transmitters, lasers and receivers that are used may vary from embodiment to embodiment depending on the capacity desired and the transfer characteristics of the fiber channel 911 carrying the data. In FIG. 9, data is input serially to a splitter 901. Splitter 901 splits the data so that three separate streams of data are coupled into three multi-carrier modulation transmitter modules 725A, 725B and 725C. The multi-carrier modulation transmitter modules 725A, 725B and 725C may be identical modules, In a preferred embodiment, each module is implemented as a single integrated circuit chip, for example, a CMOS integrated circuit chip. The multi-carrier modulation transmitters are further coupled into laser drive electronics 713A, 713B, and 713C, respectively. Laser drive electronic 713A drives laser 903, laser drive electronic 713B drives laser 905, and laser drive electronic 713C drives laser 907. The outputs of lasers 903, 905 and 907 are combined optically in a combiner 909 which also couples the combined optical beams into a fiber optic channel 911. The fiber optic channel 911 carriers the three laser beams to a receiver and beam splitter 913. The receiver and beam splitter 913 splits the output from the fiber optic channel 911 back into its constituent laser carriers. The three laser carriers are then coupled into photo detectors and amplifiers 801A, 801B, and 801C. The photo detectors and amplifiers convert the light signal into an electrical signal which is then further coupled into multi-carrier modulation receivers 825A, 825B and 825C. Multi-carrier modules 825A, 825B and 825C may be identical and may operate in parallel without needing to be aware of the operation each other. The output of the multi-carrier modulation receivers are then combined in combiner block 915A and produce an output data stream. Multi-carrier modulation transmitters, lasers and multi-carrier modulation receivers can be added as needed in order to achieve the capacity desired.

For example, if the fiber optic channel 911 is an existing fiber optic channel for a local area network and it is desired to upgrade it to service a 10 gigabit ETHERNET network, transmitters, lasers and receivers may be added in parallel until the 10 gigabit capacity is achieved. The multi-carrier modulation transmitters and receiver pairs may cooperate to characterize the fiber optic channel at each laser wavelength used. By combining multiple multi-carrier modulation transmitters, as illustrated at 917, and multi-carrier modulation receivers as illustrated at 919, a very efficient architecture for implementing high speed data rate communications utilizing existence fibers can be accomplished. For example, by combining the data splitter 901 with a plurality of multi-carrier modulation transceivers 725, as illustrated at 917, a number of lasers can be accommodated. Likewise, a number of receivers 825 and a data combiner 915 can be combined in a single integrated circuits 919. These circuits can then be coupled to laser drive electronics and laser receiving electronics as needed in order to achieve any capacity desired. Accordingly, existing fiber optic channels 911 can be upgraded at reasonable costs without having to replace existing fiber channels. The receivers and transmitters can adjust to the characteristics of the fiber channel and high speed networks, for example, 10 gigabit communication networks, can be implemented despite the fact even in fiber channels of inferior quality.

Even if fiber channels have grossly inferior transfer characteristics the channel may be upgraded to a high data rate by adding as many of the configurable multi-carrier modulation receivers in parallel as necessary to achieve the desired data rates and noise immunities.

FIG. 10 is a block diagram illustrating a modification of the transmitter of FIG. 2A to incorporate trellis coding.

Exemplarily a 4-bit input from the XGMII block 1003 is passed to a rate 5/4 convolutional coder 1005. The 5-bit output from the convolutional coder is modulated using a QAM-32 modulator 1021 prior to being coupled to a mixer 1017. The mixer 1017 then couples the mixed signal to a bandpass filter 1021, which filters out unwanted components and further provides the filtered signal to a combiner circuit 1027. The combiner circuit 1027 combines all the bandpass signals provided to it by the plurality of bandpass filters and then provides the combined signal to the laser drive electronics 1027.

Trellis coding requires an expanded constellation, but does not increase the symbol rate of the QAM modulator or the bandwidth of the modulated signal, accordingly in the present exemplary embodiment a QAM 32 modulator is used to accommodate a 5 bit input. Other modulators may be used depending on implementation requirements. The convolutional coder provides a trellis encoding that enhances the robustness of the code and reduces such problems as inter-symbol interference.

FIG. 11 is a block diagram illustrating a modification of the alternate transmitter of FIG. 4 to incorporate trellis coding. In FIG. 11 a 5/4 convolutional coder accepts a 4 bit input and provides a 5 bit output. The addition of a convolutional encoder provides redundancy in the code and provides a mechanism for reducing problems such as inter-symbol interference.

FIG. 12 is a block diagram illustrating a modification of the receiver of FIG. 3 to receive a trellis coded signal. In FIG. 12 a QAM 32 demodulator 1215 is disposed between the low pass filter (for example 1209) and the XGMII 1227. The QAM 32 demodulator 1215 produces soft decisions for the purpose of providing them to a trellis decoder 1221. The demodulator 12 has been chosen as a QAM 32 demodulator in order to match the input signal. Other demodulators may be used corresponding to the modulation of the transmit signal.

FIG. 13 is a block diagram illustrating a modification of the receiver of FIG. 4 to receive a trellis coded signal. In FIG. 13 the 32 Inverse Fourier Transform provides symbols (S) along with the complex conjugate of the signals (S*) to a trellis decoder. The trellis decoder decodes the symbols and then provides a 4 bit output signal to the XGMII to combine with other signals in order to produce the output signal.

The use of trellis coding results in increased robustness and decreased error rate in the presence of noise and other channel impairments. While FIGS. 10 through 13 show particular embodiments of trellis coding and decoding for an optical communications transceiver, it will be clear to anyone skilled in the art that many alternative embodiments are possible without departing from the spirit and scope of the present invention. For example the convolutional coders may be changed, the modulators may utilize other modulation constellations and modulation frequencies, and the modulators, encoders, bandpass filters, demodulators, also may be changed for example to accommodate the characteristics of the fiber channel.

What is claimed is:

1. An apparatus for receiving data from a channel, the apparatus comprising:
   a mixer operable to receive a wideband signal and mix it with a mixer frequency;
   a low-pass filter operable to filter a signal received from the mixer;
   a programmable demodulator operable to receive a signal from the low-pass filter, demodulate the signal received from said low-pass filter, and provide soft decisions as an output, the programmable demodulator comprising a control input that controls the type of demodulation applied to the signal received from the low-pass filter, wherein the programmable demodulator performs channel equalization; and
   a trellis decoder operable to receive soft decisions from the demodulator, perform a trellis decoding of the soft decisions, and provide hard decisions.

2. The apparatus of claim 1, wherein the mixer frequency is a programmable frequency.

3. The apparatus of claim 1, wherein the output of the mixer has an in-phase component and a quadrature-phase component.

4. The apparatus of claim 1, wherein the trellis decoder is operable to reduce inter-symbol interference.

5. The apparatus of claim 1, wherein the trellis decoder is operable to reduce attenuation and phase distortion introduced by the channel.

6. The apparatus of claim 1, wherein the type of demodulation is based on the encoding applied in each symbol, and wherein an increase in the number of bits in a symbol decreases symbol error rate.

7. An apparatus for receiving data from a channel, the apparatus comprising:
   a mixer operable to receive a wideband signal and mix it with a mixer frequency, wherein the wideband signal comprises a plurality of encoder outputs that have been combined according to an inverse fast Fourier transform;
   a low-pass filter operable to filter a signal received from the mixer;
   a programmable demodulator operable to receive a signal from the low-pass filter, demodulate the signal received from said low-pass filter, and provide soft decisions as an output, the programmable demodulator comprising a control input that controls the type of demodulation applied to the signal received from the low-pass filter; and
   a trellis decoder operable to receive soft decisions from the demodulator, perform a trellis decoding of the soft decisions, and provide hard decisions.

8. The apparatus of claim 7, wherein the mixer frequency is a programmable frequency.

9. The apparatus of claim 7, wherein the output of the mixer has an in-phase component and a quadrature-phase component.

10. The apparatus of claim 7, wherein the trellis decoder is operable to reduce inter-symbol interference.

11. The apparatus of claim 7, wherein the trellis decoder is operable to reduce attenuation and phase distortion introduced by the channel.

12. The apparatus of claim 7, wherein the type of demodulation is based on the encoding applied in each symbol, and wherein an increase in the number of bits in a symbol decreases symbol error rate.

13. An apparatus for receiving data from a channel, the apparatus comprising:

a mixer operable to receive a wideband signal and mix it with a mixer frequency, wherein the wideband signal comprises multiple carrier frequencies;

a low-pass filter operable to filter a signal received from the mixer;

a programmable demodulator operable to receive a signal from the low-pass filter, demodulate the signal received from said low-pass filter, and provide soft decisions as an output, the programmable demodulator comprising a control input that controls the type of demodulation applied to the signal received from the low-pass filter; and a trellis decoder operable to receive soft decisions from the demodulator, perform a trellis decoding of the soft decisions, and provide hard decisions.

14. The apparatus of claim 13, wherein each carrier frequency of the wideband signal comprises a variable modulation type.

15. The apparatus of claim 14, wherein the variable modulation type is one of a quadrature amplitude modulation and a phase shift keying modulation.

16. The apparatus of claim 13, wherein the mixer frequency is a programmable frequency.

17. The apparatus of claim 13, wherein the output of the mixer has an in-phase component and a quadrature-phase component.

18. The apparatus of claim 13, wherein the trellis decoder is operable to reduce inter-symbol interference.

19. The apparatus of claim 13, wherein the trellis decoder is operable to reduce attenuation and phase distortion introduced by the channel.

20. The apparatus of claim 13, wherein the type of demodulation is based on the encoding applied in each symbol, and wherein an increase in the number of bits in a symbol decreases symbol error rate.

21. An apparatus for receiving data from a channel, the apparatus comprising:

a mixer operable to receive a wideband signal and mix it with a mixer frequency;

a low-pass filter operable to filter a signal received from the mixer;

a programmable demodulator operable to receive a signal from the low-pass filter, demodulate the signal received from said low-pass filter, and provide soft decisions as an output, the programmable demodulator comprising a control input that controls the type of demodulation applied to the signal received from the low-pass filter, wherein the programmable demodulator performs parallel processing of sub-carriers; and a trellis decoder operable to receive soft decisions from the demodulator, perform a trellis decoding of the soft decisions, and provide hard decisions.

22. The apparatus of claim 21, wherein the programmable demodulator generates soft decisions by multiplexing the output of parallel sub-carrier processing.

23. The apparatus of claim 21, wherein the mixer frequency is a programmable frequency.

24. The apparatus of claim 21, wherein the output of the mixer has an in-phase component and a quadrature-phase component.

25. The apparatus of claim 21, wherein the trellis decoder is operable to reduce inter-symbol interference.

26. The apparatus of claim 21, wherein the trellis decoder is operable to reduce attenuation and phase distortion introduced by the channel.

27. The apparatus of claim 21, wherein the type of demodulation is based on the encoding applied in each symbol, and wherein an increase in the number of bits in a symbol decreases symbol error rate.

* * * * *